US011784865B2

(12) United States Patent
Horn et al.

(10) Patent No.: US 11,784,865 B2
(45) Date of Patent: Oct. 10, 2023

(54) USER EQUIPMENT INITIATED DATA AIDED PHASE TRACKING REFERENCE SIGNALS ON MULTIPLE LAYERS OF A COMMUNICATION LINK

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Michael Levitsky, Rehovot (IL); Daniel Paz, Geva Carmel (IL); Amit Bar-Or Tillinger, Tel-Aviv (IL); Ory Eger, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/178,018

(22) Filed: Feb. 17, 2021

(65) Prior Publication Data

US 2021/0336832 A1 Oct. 28, 2021

Related U.S. Application Data

(60) Provisional application No. 63/016,695, filed on Apr. 28, 2020.

(51) Int. Cl.
*H04L 27/26* (2006.01)
*H04L 5/00* (2006.01)
(Continued)

(52) U.S. Cl.
CPC ........ *H04L 27/2675* (2013.01); *H04L 1/0003* (2013.01); *H04L 5/0048* (2013.01); *H04L 25/0202* (2013.01); *H04L 25/03318* (2013.01)

(58) Field of Classification Search
None
See application file for complete search history.

(56) References Cited

U.S. PATENT DOCUMENTS 9,667,458 B1 * 5/2017 Frank .................. H04L 27/2653
2012/0195285 A1 * 8/2012 Ko .......................... H04J 13/00
370/329

(Continued)

FOREIGN PATENT DOCUMENTS

WO    WO-2010150802 A1 * 12/2010    ........... H04B 7/0678

OTHER PUBLICATIONS

Huawei, et al., "Further Details for PT-RS Design", 3GPP TSG RAN WG1 Meeting #88b, 3GPP Draft, R1-1704240, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, 5 Pages, Apr. 2, 2017 (Apr. 2, 2017), XP051242392, Retrieved from the Internet: URL: http://www.3gpp.org/ftp/Meetings_3GPP_SYNC/RAN1/Docs/[retrieved on Apr. 2, 2017] page third, paragraph first, figure 1, the whole document.

(Continued)

*Primary Examiner* — Otis L Thompson, Jr.
(74) *Attorney, Agent, or Firm* — Harrity & Harrity, LLP

(57) ABSTRACT

Various aspects of the present disclosure generally relate to wireless communication. In some aspects, a user equipment may transmit a request, for an uplink transmission or a downlink transmission, for data aided phase tracking reference signals (PT-RSs) on multiple layers of a communication link; and communicate the uplink transmission or the downlink transmission based at least in part on the request. Numerous other aspects are provided.

30 Claims, 10 Drawing Sheets

(51) Int. Cl.
*H04L 25/03* (2006.01)
*H04L 25/02* (2006.01)
*H04L 1/00* (2006.01)

(56) References Cited

U.S. PATENT DOCUMENTS

| | | | | |
|---|---|---|---|---|
| 2018/0287759 | A1* | 10/2018 | Kundargi | H04W 56/0035 |
| 2019/0182777 | A1* | 6/2019 | Zhang | H04W 52/325 |
| 2019/0296781 | A1* | 9/2019 | Lee | H04L 5/0048 |
| 2019/0379509 | A1* | 12/2019 | Stauffer | H04L 5/0048 |
| 2020/0022135 | A1* | 1/2020 | Zhang | H04B 17/345 |
| 2020/0244415 | A1* | 7/2020 | Liu | H04L 1/0003 |
| 2020/0259609 | A1* | 8/2020 | Saito | H04L 27/261 |
| 2021/0083816 | A1* | 3/2021 | Werner | H04L 25/0226 |
| 2021/0168011 | A1* | 6/2021 | Davydov | H04L 5/0048 |
| 2021/0266883 | A1* | 8/2021 | Wang | H04L 5/0007 |
| 2021/0328850 | A1 | 10/2021 | Horn | |
| 2021/0337548 | A1* | 10/2021 | Gao | H04L 5/0051 |
| 2022/0116171 | A1* | 4/2022 | Zhang | H04L 1/0025 |
| 2022/0140976 | A1* | 5/2022 | Lin | H04L 5/0053 370/329 |
| 2022/0209904 | A1* | 6/2022 | Jang | H04L 1/1887 |
| 2022/0210783 | A1* | 6/2022 | Yeo | H04W 72/0413 |
| 2022/0217813 | A1* | 7/2022 | Kim | H04W 72/0446 |

OTHER PUBLICATIONS

International Search Report and Written Opinion—PCT/US2021/022975—ISA/EPO—dated Jun. 8, 2021.

National Instruments: "Discussion on Explicit and Implicit Signaling for PT-RS", 3GPP TSG RAN WG1 Meeting #89, 3GPP Draft; R1-1708272 Discussion on Explicit and Implicit Signaling for PT-RS Final, 3rd Generation Partnership Project (3GPP), Mobile Competence Centre, 650, Route Des Lucioles; F-06921 Sophia-Ant, vol. RAN WG1, No. Hangzhou, P.R. of China, May 15, 2017-May 19, 2017, 11 Pages, May 14, 2017 (May 14, 2017), XP051273465, Retrieved from the Internet: URL: http://www.3gpp.org/ftp/Meetings_3GPP_SYNC/RAN1/Docs/ [retrieved on May 14, 2017] Section 1, p. 2, Section 2, p. 6-p. 7.

Samsung: "On DL PT-RS Design", 3GPP TSG RAN WG1 NR Ad-hoc#2, 3GPP Draft; R1-1710686 ON DL PTRS, 3rd Generation Partnership Project (3GPP), Mobile Competence Centre, 650, Route Des Lucioles, F-06921 Sophia-Antipolis Cedex, France, vol. RAN WG1, No. Qingdao, China; Jun. 27, 2017-Jun. 30, 2017, Jun. 26, 2017 (Jun. 26, 2017), 5 Pages, XP051299892, Retrieved from the Internet: URL: http://www.3gpp.org/ftp/Meetings_3GPP_SYNC/RAN1/Docs/[retrieved on Jun. 26, 2017] page fourth; figure 4, Proposals 5-6; page fifth.

* cited by examiner

USER EQUIPMENT INITIATED DATA AIDED PHASE TRACKING REFERENCE SIGNALS ON MULTIPLE LAYERS OF A COMMUNICATION LINK

CROSS-REFERENCE TO RELATED APPLICATION

This Patent Application claims priority to Provisional Patent Application No. 63/016,695, filed on Apr. 28, 2020, entitled "USER EQUIPMENT INITIATED DATA AIDED PHASE TRACKING REFERENCE SIGNALS ON MULTIPLE LAYERS OF A COMMUNICATION LINK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for user equipment initiated data aided phase tracking reference signals on multiple layers of a communication link.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include transmitting a request, for an uplink transmission or a downlink transmission, for data aided phase tracking reference signals (PT-RSs) on multiple layers of a communication link; and communicating the uplink transmission or the downlink transmission based at least in part on the request.

In some aspects, a method of wireless communication, performed by a UE, may include transmitting an indication of a capability of the UE to communicate one or more of uplink transmissions or downlink transmissions having data aided PT-RSs on multiple layers of a communication link; and communicating an uplink transmission or a downlink transmission based at least in part on the indication.

In some aspects, a method of wireless communication, performed by a base station, may include receiving a request, for an uplink transmission from a UE or a downlink transmission to the UE, for data aided PT-RSs on multiple layers of a communication link; and communicating an uplink transmission or a downlink transmission based at least in part on the request.

In some aspects, a method of wireless communication, performed by a base station, may include receiving an indication of a capability of a UE to communicate one or more of uplink transmissions or downlink transmissions having data aided PT-RSs on multiple layers of a communication link; and communicating an uplink transmission or a downlink transmission based at least in part on the indication.

In some aspects, a UE for wireless communication may include a memory and one or more processors operatively coupled to the memory. The memory and the one or more processors may be configured to transmit a request, for an uplink transmission or a downlink transmission, for data aided PT-RSs on multiple layers of a communication link; and communicate the uplink transmission or the downlink transmission based at least in part on the request.

In some aspects, a UE for wireless communication may include a memory and one or more processors operatively coupled to the memory. The memory and the one or more processors may be configured to transmit an indication of a capability of the UE to communicate one or more of uplink transmissions or downlink transmissions having data aided PT-RSs on multiple layers of a communication link; and communicate an uplink transmission or a downlink transmission based at least in part on the indication.

In some aspects, a base station for wireless communication may include a memory and one or more processors operatively coupled to the memory. The memory and the one or more processors may be configured to receive a request, for an uplink transmission from a UE or a downlink transmission to the UE, for data aided PT-RSs on multiple layers of a communication link; and communicate an uplink transmission or a downlink transmission based at least in part on the request.

In some aspects, a base station for wireless communication may include a memory and one or more processors operatively coupled to the memory. The memory and the one or more processors may be configured to receive an indication of a capability of a UE to communicate one or more of uplink transmissions or downlink transmissions having data aided PT-RSs on multiple layers of a communication link; and communicate an uplink transmission or a downlink transmission based at least in part on the indication.

In some aspects, a non-transitory computer-readable medium may store one or more instructions for wireless communication. The one or more instructions, when executed by one or more processors of a UE, may cause the one or more processors to transmit a request, for an uplink transmission or a downlink transmission, for data aided PT-RSs on multiple layers of a communication link; and communicate the uplink transmission or the downlink transmission based at least in part on the request.

In some aspects, a non-transitory computer-readable medium may store one or more instructions for wireless communication. The one or more instructions, when executed by one or more processors of a UE, may cause the one or more processors to transmit an indication of a capability of a UE to communicate one or more of uplink transmissions or downlink transmissions having data aided PT-RSs on multiple layers of a communication link; and communicate an uplink transmission or a downlink transmission based at least in part on the indication.

In some aspects, a non-transitory computer-readable medium may store one or more instructions for wireless communication. The one or more instructions, when executed by one or more processors of a base station, may cause the one or more processors to receive a request, for an uplink transmission from a UE or a downlink transmission to the UE, for data aided PT-RSs on multiple layers of a communication link; and communicate an uplink transmission or a downlink transmission based at least in part on the request.

In some aspects, a non-transitory computer-readable medium may store one or more instructions for wireless communication. The one or more instructions, when executed by one or more processors of a base station, may cause the one or more processors to receive an indication of a capability of a UE to communicate one or more of uplink transmissions or downlink transmissions having data aided PT-RSs on multiple layers of a communication link; and communicate an uplink transmission or a downlink transmission based at least in part on the indication.

In some aspects, an apparatus for wireless communication may include means for transmitting a request, for an uplink transmission or a downlink transmission, for data aided PT-RSs on multiple layers of a communication link; and means for communicating the uplink transmission or the downlink transmission based at least in part on the request.

In some aspects, an apparatus for wireless communication may include means for transmitting an indication of a capability of the apparatus to communicate one or more of uplink transmissions or downlink transmissions having data aided PT-RSs on multiple layers of a communication link; and means for communicating an uplink transmission or a downlink transmission based at least in part on the indication.

In some aspects, an apparatus for wireless communication may include means for receiving a request, for an uplink transmission from a UE or a downlink transmission to the UE, for data aided PT-RSs on multiple layers of a communication link; and means for communicating an uplink transmission or a downlink transmission based at least in part on the request.

In some aspects, an apparatus for wireless communication may include means for receiving an indication of a capability of a UE to communicate one or more of uplink transmissions or downlink transmissions having data aided PT-RSs on multiple layers of a communication link; and means for communicating an uplink transmission or a downlink transmission based at least in part on the indication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
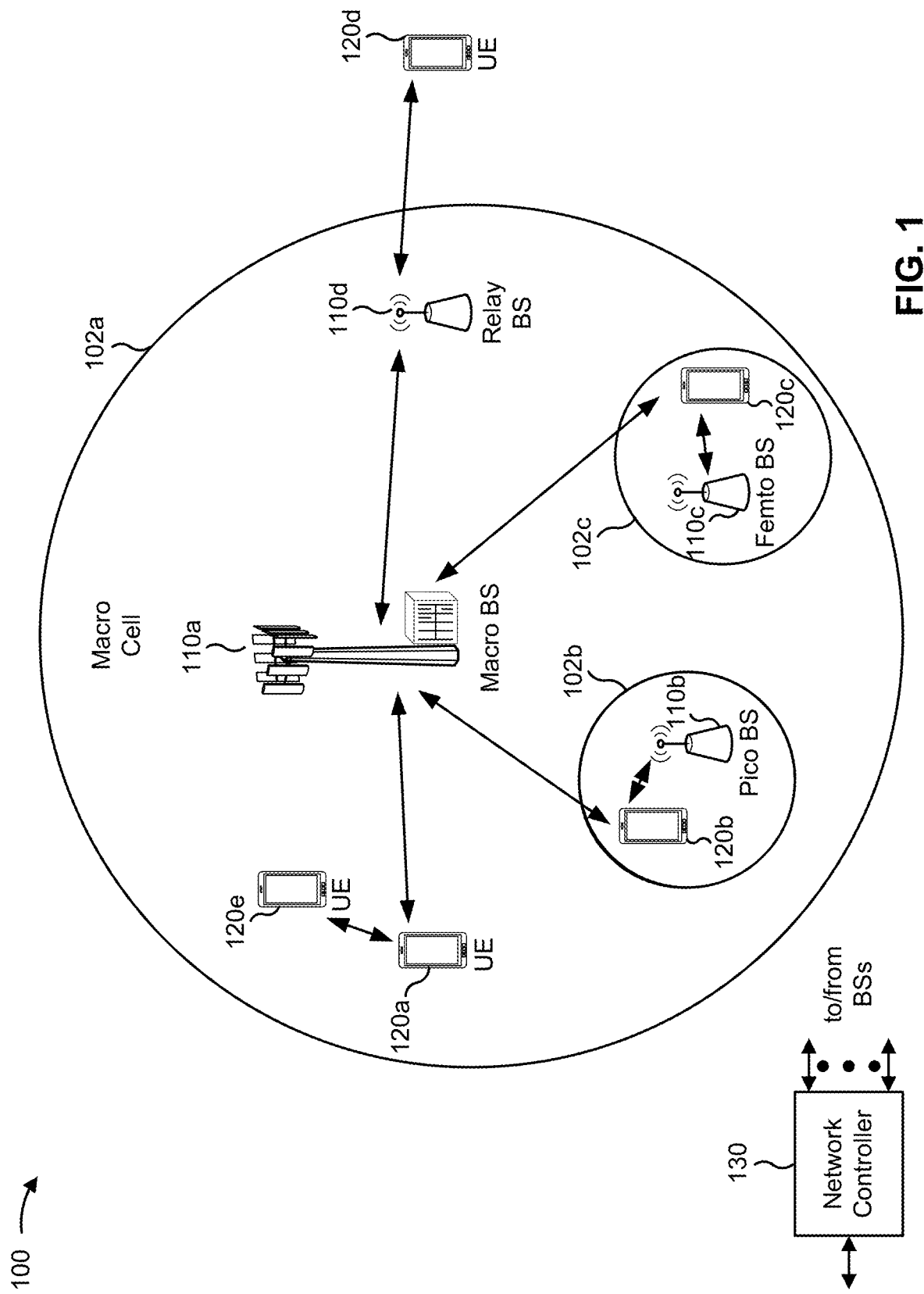
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment. UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
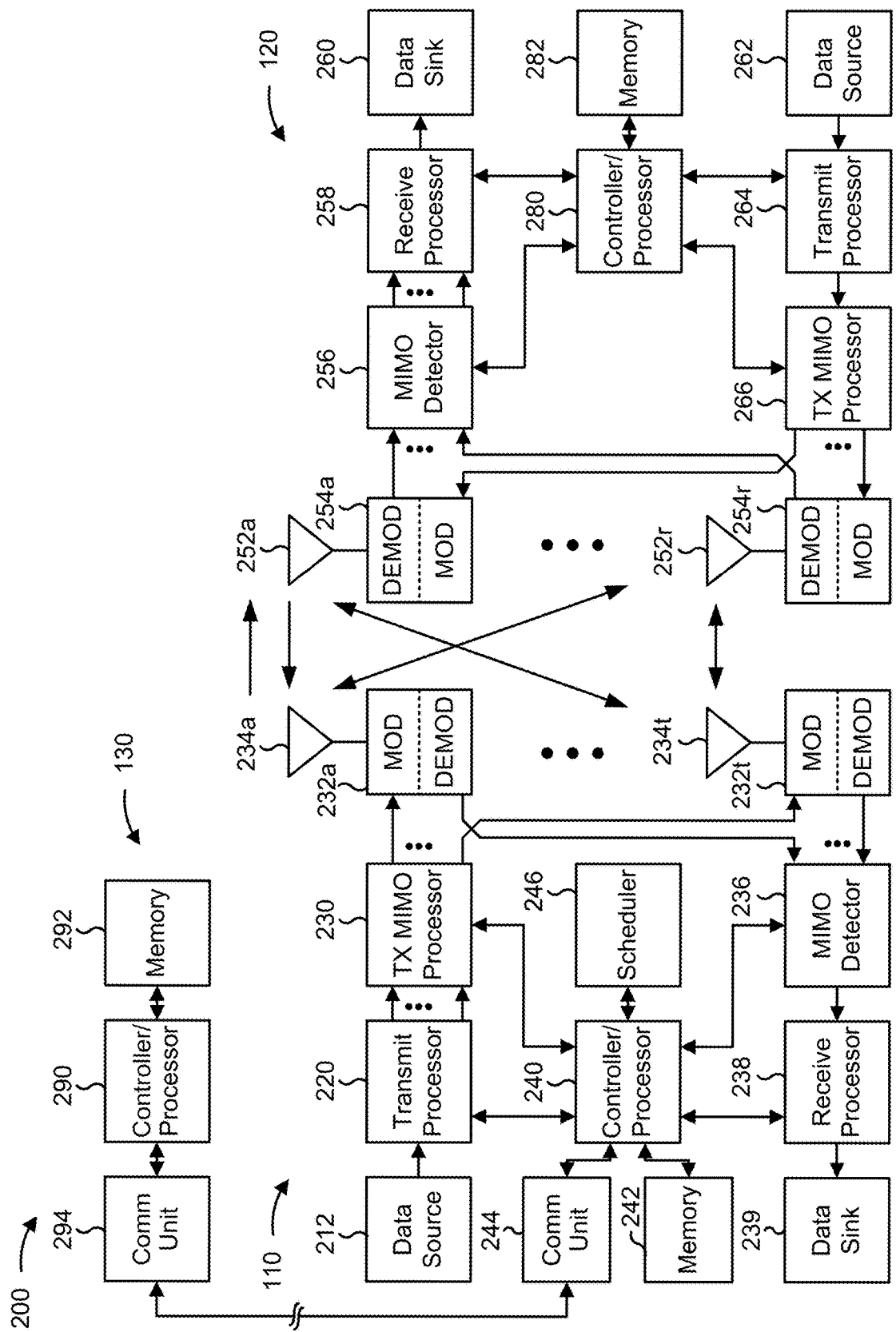
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10.

Controller/processor 240 of base station 110, controller/processor 280 of UE 120, and/or any other component(s) of FIG. 2 may perform one or more techniques associated with UE initiated data aided PT-RSs on multiple layers of a communication link, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE includes means for transmitting a request, for an uplink transmission or a downlink transmission, for data aided PT-RSs on multiple layers of a communication link; or means for communicating the uplink transmission or the downlink transmission based at least in part on the request. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving the downlink transmission; or means for determining, based at least in part on the data aided PT-RSs on the multiple layers of the communication link, one or more of: a single common phase error (CPE) for multiple antennas associated with the multiple layers of the communication link, or CPEs for respective antennas of the multiple antennas.

In some aspects, the UE includes means for re-encoding the data of the data aided PT-RSs on the multiple layers of the communication link, means for re-modulating the data of the data aided PT-RSs on the multiple layers of the communication link, means for performing channel estimation based at least in part on the re-modulated data of the data aided PT-RSs on the multiple layers of the communication link, and means for determining, based at least in part on the channel estimation, the one or more of the single CPE for multiple antennas or the CPEs for respective antennas of the multiple antennas.

In some aspects, the UE includes means for generating, based at least in part on descrambling the data of the data aided PT-RSs on the multiple layers of the communication link, a soft data estimation per layer of the data aided PT-RSs on the multiple layers of the communication link; or means for determining, based at least in part on an average of the soft data estimation per layer, the one or more of the single CPE for multiple antennas or the CPEs for respective antennas of the multiple antennas.

In some aspects, the UE includes means for transmitting a request for a modulation and coding scheme for symbols associated with the data aided PT-RSs on the multiple layers of the communication link.

In some aspects, the UE includes means for transmitting the request for the modulation and coding scheme with the request for data aided PT-RSs on the multiple layers of the communication link.

In some aspects, the UE includes means for receiving an indication of a modulation and coding scheme for symbols associated with the data aided PT-RSs on the multiple layers of the communication link.

In some aspects, the UE includes means for transmitting an indication of a capability of the UE to communicate one or more of uplink transmissions or downlink transmissions with data aided PT-RSs on the multiple layers of the communication link.

In some aspects, the UE includes means for transmitting the indication via one or more of radio resource control (RRC) signaling, a medium access control element (MAC CE), or a physical uplink control channel (PUCCH) message.

In some aspects, the UE includes means for receiving configuration information that indicates that a base station is to provide an indication of whether data aided PT-RSs on the multiple layers of the communication link is enabled.

In some aspects, the UE includes means for receiving an indication to communicate based at least in part on data aided PT-RSs on the multiple layers of the communication link.

In some aspects, the UE includes means for receiving the indication via one or more of: a downlink control information message, a medium access control element, or radio resource control signaling.

In some aspects, the UE includes means for communicating the uplink transmission or the downlink transmission based at least in part on an assumption, based at least in part on transmitting the request, that the uplink transmission or the downlink transmission is to be transmitted with data aided PT-RSs on the multiple layers of the communication link.

In some aspects, the UE includes means for reporting a NACK for the data aided PT-RSs on the multiple layers of the communication link; or means for receiving a repetition of the data aided PT-RSs on the multiple layers of the communication link via a subsequent PT-RS resource.

In some aspects, the UE includes means for transmitting an indication of a capability of the UE to communicate one or more of uplink transmissions or downlink transmissions having data aided phase tracking reference signals (PT-RSs) on multiple layers of a communication link; or means for communicating an uplink transmission or a downlink transmission based at least in part on the indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for transmitting the indication via one or more of RRC, a MAC CE, or a PUCCH message.

In some aspects, the UE includes means for transmitting a request, for the uplink transmission or the downlink transmission, for data aided PT-RSs on the multiple layers of the communication link.

In some aspects, the UE includes means for receiving the downlink transmission; or means for determining, based at least in part on the data aided PT-RSs on the multiple layers of the communication link, one or more of: a single CPE for multiple antennas associated with the multiple layers of the communication link, or CPEs for respective antennas of the multiple antennas.

In some aspects, the UE includes means for re-encoding the data of the data aided PT-RSs on the multiple layers of the communication link, means for re-modulating the data of the data aided PT-RSs on the multiple layers of the communication link, means for performing channel estimation based at least in part on the re-modulated data of the data aided PT-RSs on the multiple layers of the communication link, and means for determining, based at least in part on the channel estimation, the one or more of the single CPE for multiple antennas or the CPEs for respective antennas of the multiple antennas.

In some aspects, the UE includes means for generating, based at least in part on descrambling the data of the data aided PT-RSs on the multiple layers of the communication link, a soft data estimation per layer of the data aided PT-RSs on the multiple layers of the communication link; or means for determining, based at least in part on an average of the soft data estimation per layer, the one or more of the single CPE for multiple antennas or the CPEs for respective antennas of the multiple antennas.

In some aspects, the UE includes means for transmitting a request for a modulation and coding scheme for symbols associated with the data aided PT-RSs on the multiple layers of the communication link.

In some aspects, the UE includes means for transmitting the request for the modulation and coding scheme with the request for data aided PT-RSs on the multiple layers of the communication link.

In some aspects, the UE includes means for receiving an indication of a modulation and coding scheme for symbols associated with the data aided PT-RSs on the multiple layers of the communication link.

In some aspects, the UE includes means for transmitting an indication of a capability of the UE to communicate one or more of uplink transmissions or downlink transmissions with data aided PT-RSs on the multiple layers of the communication link.

In some aspects, the UE includes means for transmitting the indication via one or more of RRC, a MAC CE, or a PUCCH message.

In some aspects, the UE includes means for receiving configuration information that indicates that a base station is to provide an indication of whether data aided PT-RSs on the multiple layers of the communication link is enabled.

In some aspects, the UE includes means for receiving an indication to communicate based at least in part on data aided PT-RSs on the multiple layers of the communication link.

In some aspects, the UE includes means for receiving the indication via one or more of:

In some aspects, the UE includes means for communicating the uplink transmission or the downlink transmission based at least in part on an assumption, based at least in part on transmitting the indication, that the uplink transmission or the downlink transmission is to be transmitted with data aided PT-RSs on the multiple layers of the communication link.

In some aspects, the UE includes means for reporting a NACK for the data aided PT-RSs on the multiple layers of the communication link; or means for receiving a repetition of the data aided PT-RSs on the multiple layers of the communication link via a subsequent PT-RS resource.

In some aspects, the base station includes means for receiving a request, for an uplink transmission from a UE or a downlink transmission to the UE, for data aided PT-RSs on multiple layers of a communication link; or means for communicating an uplink transmission or a downlink transmission based at least in part on the request. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining whether to transmit the downlink transmission with data aided PT-RSs on the multiple layers of the communication link based at least in part on one or more of: a request from the UE to communicate with data aided PT-RSs on the multiple layers of the communication link, an amount of data buffered for the downlink transmission, a size of a resource grant associated with the downlink transmission, a reference signal received power associated with the UE, or movement of the UE.

In some aspects, the base station includes means for receiving the uplink transmission; or means for determining, based at least in part on the data aided PT-RSs on the multiple layers of the communication link, one or more of: a single CPE for multiple antennas associated with the multiple layers of the communication link, or CPEs for respective antennas of the multiple antennas.

In some aspects, the base station includes means for re-encoding the data of the data aided PT-RSs on the multiple layers of the communication link, means for re-modulating the data of the data aided PT-RSs on the multiple layers of the communication link, means for performing channel estimation based at least in part on the re-modulated data of the data aided PT-RSs on the multiple layers of the communication link, and means for determining, based at least in part on the channel estimation, the one or more of the single CPE for multiple antennas or the CPEs for respective antennas of the multiple antennas.

In some aspects, the base station includes means for generating, based at least in part on descrambling the data of the data aided PT-RSs on the multiple layers of the communication link, a soft data estimation per layer of the data aided PT-RSs on the multiple layers of the communication link; or means for determining, based at least in part on an average of the soft data estimation per layer, the one or more of the single CPE for multiple antennas or the CPEs for respective antennas of the multiple antennas.

In some aspects, the base station includes means for receiving a request for a modulation and coding scheme for symbols associated with the data aided PT-RSs on the multiple layers of the communication link.

In some aspects, the base station includes means for receiving the request for the modulation and coding scheme with the request for data aided PT-RSs on the multiple layers of the communication link.

In some aspects, the base station includes means for transmitting an indication of a modulation and coding scheme for symbols associated with the data aided PT-RSs on the multiple layers of the communication link.

In some aspects, the base station includes means for receiving an indication of a capability of the UE to communicate one or more of uplink transmissions or downlink transmissions with data aided PT-RSs on the multiple layers of the communication link.

In some aspects, the base station includes means for receiving the indication via one or more of RRC, a MAC CE, or a PUCCH message.

In some aspects, the base station includes means for transmitting configuration information that indicates that the base station is to provide an indication of whether data aided PT-RSs on the multiple layers of the communication link is enabled.

In some aspects, the base station includes means for transmitting an indication to communicate based at least in part on data aided PT-RSs on the multiple layers of the communication link.

In some aspects, the base station includes means for transmitting the indication via one or more of: a downlink control information message, a medium access control control element, or radio resource control signaling.

In some aspects, the base station includes means for communicating the uplink transmission or the downlink transmission based at least in part on an assumption, based at least in part on receiving the request, that the uplink transmission or the downlink transmission is to be transmitted with data aided PT-RSs on the multiple layers of the communication link.

In some aspects, the base station includes means for receiving a NACK for the data aided PT-RSs on the multiple layers of the communication link; or means for transmitting a repetition of the data aided PT-RSs on the multiple layers of the communication link via a subsequent PT-RS resource.

In some aspects, the base station includes means for receiving an indication of a capability of a UE to communicate one or more of uplink transmissions or downlink transmissions having data aided PT-RSs on multiple layers of a communication link; or means for communicating an uplink transmission or a downlink transmission based at least in part on the indication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for determining whether to transmit the downlink transmission with data aided PT-RSs on the multiple layers of the communication link based at least in part on one or more of: receiving the indication via one or more of RRC, a MAC CE, or a PUCCH message.

In some aspects, the base station includes means for receiving the indication via one or more of RRC, a MAC CE, or a PUCCH message.

In some aspects, the base station includes means for receiving a request, for the uplink transmission or the downlink transmission, for data aided PT-RSs on the multiple layers of the communication link.

In some aspects, the base station includes means for receiving the uplink transmission; or means for determining, based at least in part on the data aided PT-RSs on the multiple layers of the communication link, one or more of: a single CPE for multiple antennas associated with the multiple layers of the communication link, or CPEs for respective antennas of the multiple antennas.

In some aspects, the base station includes means for re-encoding the data of the data aided PT-RSs on the multiple layers of the communication link, means for re-modulating the data of the data aided PT-RSs on the multiple layers of the communication link, means for performing channel estimation based at least in part on the re-modulated data of the data aided PT-RSs on the multiple layers of the communication link, and means for determining, based at least in part on the channel estimation, the one or more of the single CPE for multiple antennas or the CPEs for respective antennas of the multiple antennas.

In some aspects, the base station includes means for generating, based at least in part on descrambling the data of the data aided PT-RSs on the multiple layers of the communication link, a soft data estimation per layer of the data aided PT-RSs on the multiple layers of the communication link; or means for determining, based at least in part on an average of the soft data estimation per layer, the one or more of the single CPE for multiple antennas or the CPEs for respective antennas of the multiple antennas.

In some aspects, the base station includes means for receiving a request for a modulation and coding scheme for symbols associated with the data aided PT-RSs on the multiple layers of the communication link.

In some aspects, the base station includes means for receiving the request for the modulation and coding scheme with the request for data aided PT-RSs on the multiple layers of the communication link.

In some aspects, the base station includes means for transmitting an indication of a modulation and coding scheme for symbols associated with the data aided PT-RSs on the multiple layers of the communication link.

In some aspects, the base station includes means for receiving an indication of a capability of the UE to communicate one or more of uplink transmissions or downlink transmissions with data aided PT-RSs on the multiple layers of the communication link.

In some aspects, the base station includes means for receiving the indication via one or more of RRC, a MAC CE, or a PUCCH message.

In some aspects, the base station includes means for transmitting configuration information that indicates that the base station is to provide an indication of whether data aided PT-RSs on the multiple layers of the communication link is enabled.

In some aspects, the base station includes means for transmitting an indication to communicate based at least in part on data aided PT-RSs on the multiple layers of the communication link.

In some aspects, the base station includes means for transmitting the indication via one or more of: a downlink control information message, a medium access control control element, or radio resource control signaling In some aspects, the base station includes means for communicating the uplink transmission or the downlink transmission based at least in part on an assumption, based at least in part on receiving the indication, that the uplink transmission or the downlink transmission is to be transmitted with data aided PT-RSs on the multiple layers of the communication link.

In some aspects, the base station includes means for receiving a NACK for the data aided PT-RSs on the multiple layers of the communication link; or means for receiving a repetition of the data aided PT-RSs on the multiple layers of the communication link via a subsequent PT-RS resource.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
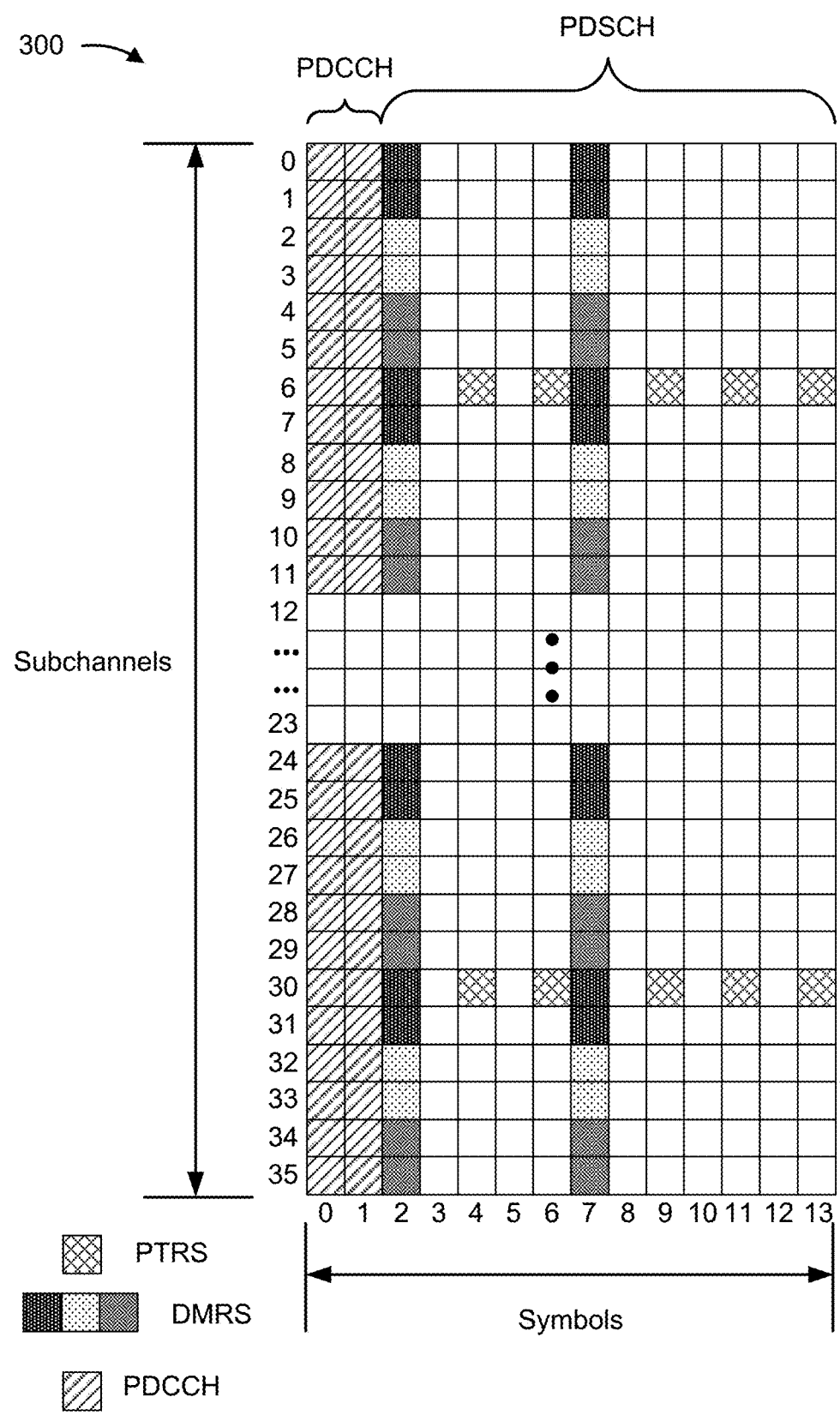
FIG. 3 is a diagram illustrating an example phase tracking reference signal structure in a physical downlink shared channel, in accordance with the present disclosure.

FIG. 3 is a diagram illustrating an example 300 phase tracking reference signal structure in a physical downlink shared channel (PDSCH), in accordance with the present disclosure. As shown, the PDSCH may include a number of subchannels (e.g., 36 subchannels) and a number of symbols (e.g., 14 symbols).

A base station may transmit, and a UE may receive (e.g., or attempt to receive) PT-RSs, DMRSs, data, and/or the like using the PDSCH. Although described with reference to a PDSCH, the structure may be similarly applied to a physical uplink shared channel (PUSCH).

The PT-RSs may be a pilot for the PDSCH and may have a density in a frequency domain (e.g., relative to subcarriers) and a time domain (e.g., relative to symbols allocated for data). As shown in FIG. 3, the PT-RSs may have a density of $1/2$ in the time domain and a density of $1/24$ (e.g., 1 per resource block) in a frequency domain. The UE may receive the PT-RSs via a single port (e.g., port 1000) or multiple ports.

In some examples, the PT-RSs may be allocated using 1 resource (e.g., a resource element or a subchannel) per 2 resource blocks, 1 resource per 4 resource blocks, and/or the like. In some examples, the PT-RSs may be allocated using 1 resource element of a resource block per 1 symbol, 1 resource element of a resource block per 2 symbols, 1 resource element of a resource block per 4 symbols, and/or the like. A configuration of the PT-RSs may be configured (e.g., using RRC signaling) and/or may be based at least in part on an associated MCS of the PDSCH. The PT-RSs may be defined by a Gold sequence.

As shown, the PDSCH may have a number (e.g., 2) of single-symbol DMRSs of a DMRS type (e.g., DMRS type 2). For example, the PDSCH may have 1 DMRS symbol per resource block. A receiving device may use the DMRS to roughly estimate and/or correct a frequency error within the symbol that includes the DMRS.

A PDSCH or a PUSCH may include PT-RSs for a receiving device (e.g., a UE, a base station, and/or the like) to account for residual frequency offset (e.g., a frequency offset that is developed within a resource block or slot), phase noise (e.g., introduced by an oscillator at a transmitting device, the receiving device, and/or the like), a common phase error (e.g., a common phase rotation of subcarriers of the PDSCH, the PUSCH, and/or the like), and/or the like. For example, a receiving device may use the PT-RSs to estimate and/or correct phase noise (e.g., based at least in part on a detected residual frequency offset, a CPE, and/or the like).

However, using PT-RSs in dedicated symbols that may otherwise be allocated to data (e.g., application data) in the PDSCH may reduce a potential throughput of the PDSCH. Additionally, using PT-RSs in dedicated symbols for each layer (e.g., spatial layer, data stream, and/or the like) may reduce a potential throughput of the PDSCH. In some examples, dedicated symbols allocated for the PT-RSs may include $1/24$ (about 4.16%) of symbols of the PDSCH. By allocating resources for PT-RSs, a UE and/or a base station may consume computing, communication, and/or network resources to schedule additional resources to compensate for a reduction of throughput by consuming resources for the PT-RSs.

As indicated above, FIG. 3 is provided as an example. Other examples may differ from what is described with respect to FIG. 3.

In some aspects described herein, a UE and a base station may communicate with data aided PT-RSs on multiple layers of a communication link. In other words, a PDSCH or a PUSCH may be transmitted having data multiplexed with a PT-RS sequence in resources allocated for PT-RSs on multiple layers of the communication link. In some aspects, the UE may transmit an indication of a capability to communicate with data aided PT-RSs (e.g., with resources that would otherwise have been dedicated to PT-RSs without additional data) on multiple layers of the communication link. In some aspects, the base station may transmit an indication (e.g., in downlink control information (DCI)) that one or more uplink transmissions or downlink transmissions are to be communicated with data aided PT-RSs on multiple layers of the communication link. In some aspects, the UE may transmit a request to communicate one or more uplink transmissions or downlink transmissions having data aided PT-RSs on multiple layers of the communication link. In some aspects, the base station may transmit a request to communicate one or more uplink transmissions or downlink transmissions with data aided PT-RSs on multiple layers of the communication link.

Based at least in part on the UE indicating a capability to communicate with data aided PT-RSs on multiple layers of the communication link and/or the UE requesting to communicate with data aided PT-RSs on multiple layers of the communication link, the base station and/or the UE may conserve computing, communication, and/or network resources that may otherwise have been used to schedule additional resources to compensate for using dedicated resources for PT-RSs. In some aspects, a throughput of a PDSCH or a PUSCH may improve by about 4%.

Figure 4:
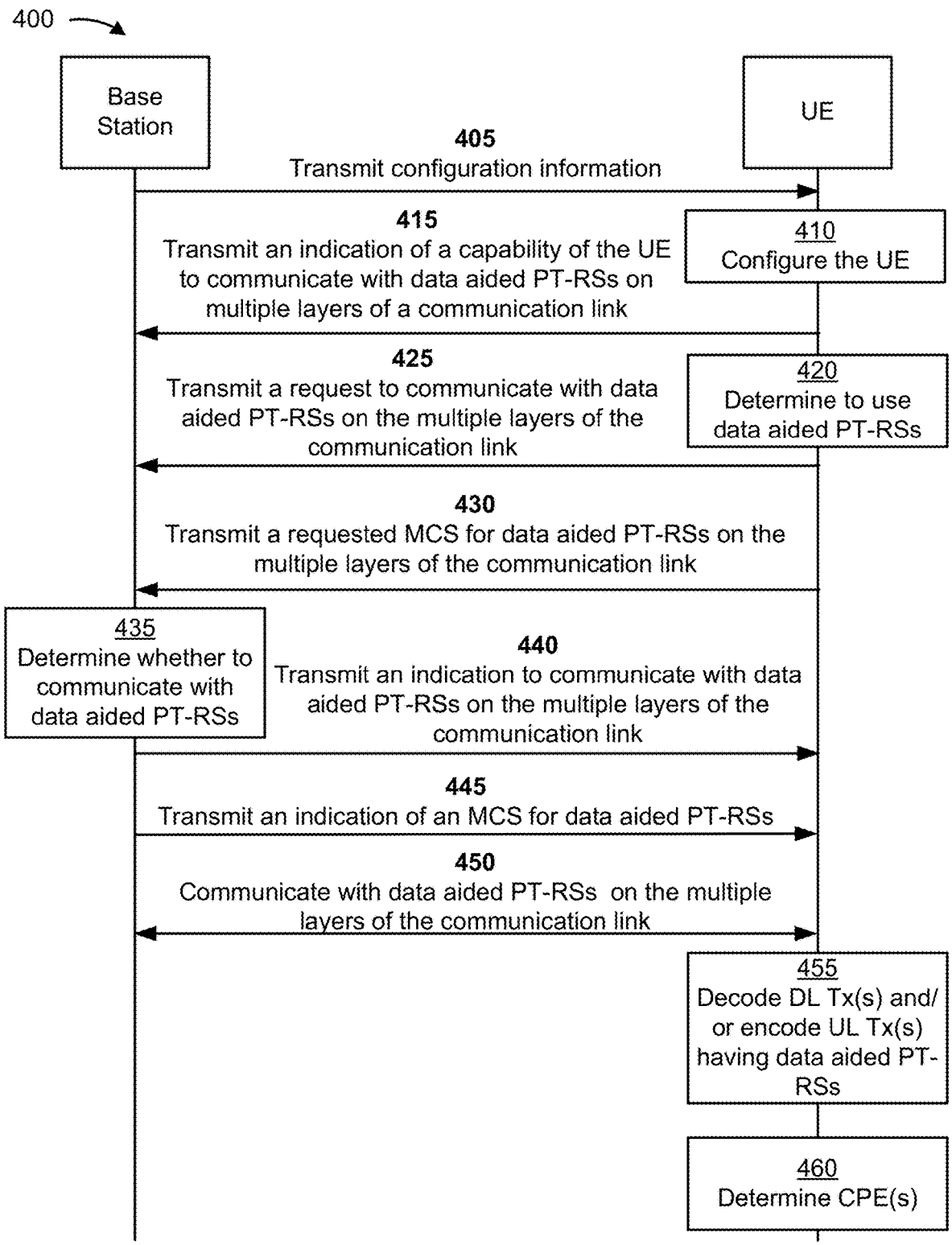
FIG. 4 is a diagram illustrating an example of user equipment initiated data aided phase tracking reference signals on multiple layers of a communication link, in accordance with the present disclosure.

FIG. 4 is a diagram illustrating an example 400 of UE initiated data aided PT-RSs on multiple layers of a communication link, in accordance with the present disclosure. As shown in FIG. 4, a UE (e.g., UE 120) may communicate (e.g., transmit an uplink transmission and/or receive a downlink transmission) with a base station (e.g., base station 110). In some aspects, the UE may communicate with another UE via one or more sidelink communications (e.g., in addition to, or in place of, communicating with the base station). The UE and the base station may be part of a wireless network (e.g., wireless network 100).

As shown by reference number 405, the base station may transmit, and the UE may receive, configuration information. In some aspects, the UE may receive configuration information from another device (e.g., from another base station, another UE, and/or the like). In some aspects, the UE may receive the configuration information via one or more of RRC signaling, MAC signaling (e.g., MAC CEs), and/or the like. In some aspects, the configuration information may include an indication of one or more configuration parameters (e.g., already known to the UE) for selection by the UE, explicit configuration information for the UE to use to configure the UE, and/or the like.

In some aspects, the configuration information may indicate that the UE is to provide an indication of a capability of the UE to communicate with data aided PT-RSs on multiple layers of a communication link (e.g., for a PUSCH, a PDSCH, and/or the like). In some aspects, the configuration information may indicate that the base station may communicate with data aided PT-RSs on multiple layers of the communication link. For example, the base station may be configured to communicate with data aided PT-RSs based at least in part on receiving a request from the UE, based at least in part on a determination by the base station that dedicated PT-RSs (e.g., on multiple layers of the communication link) are unnecessary, and/or the like. In some aspects, the configuration information may indicate that the base station is to provide an indication of whether data aided PT-RSs on the multiple layers of the communication link are enabled.

In some aspects, the configuration information may indicate that the UE is to be configured to communicate with data aided PT-RSs on multiple layers of the communication link for a single transmission (e.g., uplink or downlink), a specified number of transmissions, a set of transmissions scheduled by a configured grant, transmissions within a specified time period, and/or the like.

In some aspects, the configuration information may indicate an MCS for symbols used for data aided PT-RSs on multiple layers of the communication link. In some aspects, the configuration may indicate a difference in MCS between symbols that are used for data aided PT-RSs and symbols used to transmit other data (e.g., for all layers, for some layers, separately for each layer, and/or the like). In some aspects, the configuration information may indicate a maximum MCS for symbols used for data aided PT-RSs on multiple layers of the communication link.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the UE may transmit, and the base station may receive, an indication of a capability of the UE to communicate (e.g., one or more of uplink transmissions or downlink transmissions) using data aided PT-RSs on multiple layers of the communication link. For example, the UE may indicate a capability of the UE to communicate using data aided PT-RSs on multiple layers of the communication link based at least in part on the UE being configured to determine and correct at least a portion of CPE using data that is transmitted using resources allocated for data aided PT-RSs on multiple layers of the communication link. In some aspects, the UE may transmit the indication via RRC signaling, one or more MAC CEs, a PUCCH message, and/or the like.

As shown by reference number 420, the UE may determine to use data aided PT-RSs on multiple layers of the communication link for one or more uplink transmissions or downlink transmissions. In some aspects, the UE may determine to communicate using data aided PT-RSs on multiple layers of the communication link based at least in part on one or more metrics, such as an amount of data buffered for uplink transmission or downlink transmission that satisfies a threshold, a size of a resource grant associated with one or more uplink transmissions or downlink transmissions (e.g., compared with the amount of data buffered for transmission), an RSRP associated with the UE satisfying a threshold, a signal to interference plus noise ratio (SINR) that satisfies a threshold, and/or the like. In some aspects, the UE may determine to communicate using data aided PT-RSs based at least in part on current metrics, predicted metrics, and/or the like.

As shown by reference number 425, the UE may transmit, and the base station may receive, a request to communicate using data aided PT-RSs on multiple layers of the communication link. In some aspects, the UE may transmit the request via a PUSCH transmission. In some aspects, the request may include a single bit indicator of whether or not data aided PT-RSs on multiple layers of the communication link are requested for one transmission (uplink or downlink), a set of transmissions (uplink and/or downlink), and/or the like. In some aspects, the request may include an indication of one or more of the multiple layers on which the UE requests to use data aided PT-RSs. In some aspects, the request may include an indication of a capability of the UE to communicate one or more of uplink transmissions or downlink transmissions with data aided PT-RSs on the multiple layers of the communication link.

For example, the UE may transmit a request, for an uplink transmission or a downlink transmission, to use data aided PT-RSs on multiple layers of the communication link. In some aspects, the request may apply to a single subsequent downlink transmission or uplink transmission, a set of downlink transmissions or a set of uplink transmissions scheduled by a configured grant, a specified number of downlink transmissions or uplink transmissions, downlink transmissions or uplink transmissions within a specified time period, and/or the like.

As shown by reference number 430, the UE may transmit, and the base station may receive, a requested MCS for data aided PT-RSs. For example, the UE may transmit a request for an MCS for symbols associated with the data aided PT-RSs on multiple layers of the communication link. In some aspects, the request may explicitly indicate a requested MCS, may indicate a requested difference between an MCS for symbols associated with data aided PT-RSs and an MCS for symbols associated with other data, and/or the like.

As shown by reference number 435, the base station may determine whether to communicate with data aided PT-RSs on multiple layers of the communication link. For example, the base station may determine whether to comply with a request from the UE to communicate using data aided PT-RSs on multiple layers of the communication link, the base station may determine, independently from a request from the UE, to communicate using data aided PT-RSs on multiple layers of the communication link, and/or the like. In some aspects, the base station may determine to not comply with a request from the UE based at least in part on one or more metrics, such as an amount of buffered data for a downlink transmission, a size of a resource grant of an associated transmission (e.g., to which the request applies), an RSRP associated with the UE, movement of the UE, MCS for upcoming communications, a predicted change of conditions for SINR, and/or the like.

In some aspects, the base station may determine, independently from a request from the UE, to communicate (e.g., receive uplink transmissions or transmit downlink transmissions) with data aided PT-RSs on multiple layers of the communication link based at least in part on a request from the UE to communicate with data aided PT-RSs on multiple layers of the communication link and/or one or more metrics, such as a network load associated with the base station, an amount of data buffered for uplink transmission or downlink transmission (e.g., that satisfies a threshold), a size of a resource grant associated with one or more uplink transmissions or downlink transmissions (e.g., compared with the amount of data buffered for transmission), an RSRP associated with the UE (e.g., that satisfies a threshold), a SINR (e.g., that satisfies a threshold), and/or the like. In some aspects, the base station may determine to communicate using data aided PT-RSs on multiple layers of the communication link based at least in part on current metrics, predicted metrics, and/or the like.

As shown by reference number 440, the base station may transmit, and the UE may receive, an indication to communicate using data aided PT-RSs. For example, the indication may indicate that the base station has approved a request from the UE, that the base station has determined to communicate using data aided PT-RSs, and/or the like. In some aspects, the base station may transmit the indication, based at least in part on receiving the indication of the capability of the UE, that resources that would otherwise have been allocated for dedicated PT-RSs are to be allocated for data aided PT-RSs. In some aspects, the indication may indicate one or more layers on which data aided PT-RSs are to be used. In some aspects, the base station may provide the indication via a DCI message (e.g., using one or more bits), a MAC CE, and/or the like.

As shown by reference number 445, the base station may transmit, and the UE may receive, an indication of an MCS for data aided PT-RSs on multiple layers of the communication link. In other words, the base station may transmit an indication of an MCS for symbols associated with the data aided PT-RSs on multiple layers of the communication link. In some aspects, the indication of the MCS may indicate an MCS to use on respective layers (e.g., explicitly, relative to another MCS, and/or the like).

In some aspects, the base station may provide the indication via a DCI message (e.g., using one or more bits), a MAC CE, and/or the like. In some aspects, the base station may transmit the indication of the MCS in a single message (e.g., a DCI message, MAC layer signaling, and/or the like) with the indication to communicate using data aided PT-RSs. For example, a DCI message may include 2 or more bits to indicate that data aided PT-RSs are enabled and to indicate the MCS. The indication of the MCS may explicitly indicate the MCS, may indicate a difference between an MCS for symbols associated with data aided PT-RSs and an MCS for symbols associated with other data, and/or the like.

As shown by reference number 450, the UE and the base station may communicate using data aided PT-RSs on multiple layers of the communication link. For example, the UE may transmit uplink transmissions and/or receive downlink transmissions using data aided PT-RSs on multiple layers of the communication link. In some aspects, the data aided PT-RSs on multiple layers of the communication link may include a PT-RS sequence that is multiplexed with data.

In some aspects, the UE may communicate (e.g., receive and/or transmit) the uplink transmission or the downlink transmission based at least in part on an assumption, based at least in part on transmitting the request for data aided PT-RSs on multiple layers of the communication link, that the uplink transmission or the downlink transmission is to be transmitted (e.g., by the UE or the base station) having data aided PT-RSs on multiple layers of the communication link. In other words, the UE may assume, without receiving additional signaling to confirm, that the base station will comply with the request to communicate using data aided PT-RSs on multiple layers of the communication link.

In some aspects, data that is transmitted on resources associated with data aided PT-RSs (e.g., on each layer) may have a cyclical redundancy check (CRC) that is different from one or more CRCs associated with other data of the uplink transmission or the downlink transmission (e.g., on a corresponding layer). In some aspects, a receiving device may decode the data associated with data aided PT-RSs based at least in part on convolution codes, polar codes, low-density parity-check codes, DMRSs, and/or the like.

In some aspects, data transmitted on resources associated with the data aided PT-RSs may be associated with a dedicated acknowledgement/negative acknowledgment (ACK/NACK) bit that is different from one or more ACK/NACK bits that are associated with other data communicated via the uplink transmission or the downlink transmission. In some aspects, based at least in part on reporting a NACK for the data aided PT-RSs, the base station may transmit, and the UE may receive (e.g., attempt to decode) a repetition of the data aided PT-RSs via a subsequent PT-RS resource.

As shown by reference number 455, the UE may decode (e.g., demodulate, decode, receive, and/or the like) downlink transmissions and/or encode (e.g., modulate, encode, and/or the like) uplink transmissions having data aided PT-RSs on multiple layers of the communication link. In some aspects, the UE may decode data that is transmitted on resources associated with the data aided PT-RSs on multiple layers of the communication link. For example, the UE may decode the data based at least in part on a configured MCS for data aided PT-RSs, based at least in part on a configured difference of an MCS for data aided PT-RSs and an MCS for other data of uplink transmissions or downlink transmissions, and/or the like. In some aspects, the UE may decode the data that is transmitted on resources associated with the data aided PT-RSs on multiple layers of the communication link based at least in part on one or more DMRSs (e.g., on respective layers of the multiple layers).

In some aspects, the UE may decode the data of the data aided PT-RSs (e.g., data that is multiplexed with a PT-RS sequence on resources associated with the data aided PT-RSs on the multiple layers of the communication link) based at least in part on an indication of the multiple layers to be used for data aided PT-RSs, an indication of the MCS to be used for the data aided PT-RSs, and/or the like. In some aspects, the UE may determine the MCS for the data aided PT-RSs based at least in part on a configuration (e.g., received as configuration information, RRC signaling, and/or the like). In some aspects, the UE may determine the layers to be used for data aided PT-RSs based at least in part on a configuration (e.g., received as configuration information, RRC signaling, and/or the like).

As shown by reference number 460, the UE may determine one or more CPEs of a downlink transmission. For example, the UE may determine a single CPE for multiple antennas associated with the multiple layers of the communication link, CPEs for respective antennas of the multiple antennas, and/or the like. In some aspects, the UE may determine the one or more CPEs of the downlink transmission based at least in part on convolution codes, polar codes, low-density parity-check codes, DMRSs, and/or the like.

In some aspects, the UE may determine the one or more CPEs of the downlink transmission based at least in part on re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, determining the one or more of CPEs based at least in part on the channel estimation, and/or the like.

In some aspects, the UE may descramble the data of the data aided PT-RSs on the multiple layers of the communication link, generate a soft data estimation per layer of the data aided PT-RSs, average the soft data estimation per layer, and/or the like to determine the one or more CPEs of the downlink transmission (e.g., for respective antennas of the UE).

In some aspects, the UE may perform channel estimation (e.g., after the PT-RS data is decoded) for multiple layers using PT-RSs (e.g., MIMO PT-RS) using solutions having various levels of accuracy and/or complexity. For example, the UE may perform channel estimation for only a first port (e.g., associated with a first layer) using, for example, Equations 1-4:

$$Y_1 = h_{11}^{ptrs} s_1 + h_{12}^{ptrs} s_2 + n_1; \quad \text{Equation 1}$$

$$Y_2 = h_{21}^{ptrs} s_1 + h_{22}^{ptrs} s_2 + n_2; \quad \text{Equation 2}$$

$$\tilde{h}_{11}^{ptrs} = \frac{Y_1 - h_{12}^{dmrs} s_2}{s_1}; \quad \text{Equation 3}$$

$$\tilde{h}_{21}^{ptrs} = \frac{Y_2 - h_{22}^{dmrs} s_2}{s_1} \quad \text{Equation 4}$$

In Equations 1-4, $Y_1$ is a signal in a frequency domain of a subcarrier as observed by a first receiver antenna (first port), $h_{11}^{ptrs}$ is a PT-RS channel response of a first layer (e.g., transmitted by a first transmitter of the base station) as received via a first receiver antenna, $h_{12}^{ptrs}$ is a PT-RS channel response of the first layer as received via a second receiver antenna (second port). $Y_2$ is a signal in the frequency domain of the subcarrier as observed by a second receiver antenna (second port), $h_{21}^{ptrs}$ is a PT-RS channel response of a second layer (e.g., transmitted by a second transmitter of the base station) as received via the first receiver antenna, and $h_{22}^{ptrs}$ is a PT-RS channel response of the second layer as received via the second receiver antenna. In Equations 1-4, $s_1$ and $s_2$ may be the data of the data aided PT-RSs determined based at least in part on decoding the PT-RS data. In some aspects, $n_1$ and $n_2$ may be noise associated with the first receiver antenna and the second receiver antenna, respectively.

In Equation 3, the UE may use $h_{12}^{dmrs}$ (a channel estimation of DMRS of the second layer as observed via the first receiver antenna) as an estimate of $h_{12}^{ptrs}$ to estimate $\tilde{h}_{11}^{ptrs}$ without first solving for $h_{12}^{ptrs}$. Similarly, in Equation 4, the UE may use $h_{22}^{dmrs}$ (a channel estimation of DMRS of the second layer as observed via the second receiver antenna) as an estimate of $h_{22}^{ptrs}$ to estimate $\tilde{h}_{21}^{ptrs}$ without first solving for $h_{12}^{ptrs}$. The UE may use similar equations to estimate $h_{12}^{ptrs}$ and/or $h_{22}^{ptrs}$.

In some aspects, the UE may use a linear minimum mean square error (LMMSE) for each receiver antenna over a full bandwidth of the PDSCH to perform channel estimation. For example, the UE may use Equations 5-9:

$$y = DF_c h + n; \quad \text{Equation 5}$$

$$y == [D_1 \; D_2]\begin{bmatrix}H_1\\H_2\end{bmatrix} + n = [D_1 \; D_2]\begin{bmatrix}F_c & 0\\0 & F_c\end{bmatrix}_c \begin{bmatrix}h_1\\h_2\end{bmatrix} + n; \quad \text{Equation 6}$$

$$H_1 = F_c \left(F_c^H D_1^H R_{nn}^{-1} D_1 F_c + R_{\tilde{h}\tilde{h}}^{-1}\right)^{-1} F_c^H D_1^H R_{nn}^{-1} y; \quad \text{Equation 7}$$

$$H_2 = F_c \left(F_c^H D_2^H R_{nn}^{-1} D_2 F_c + R_{\tilde{h}\tilde{h}}^{-1}\right)^{-1} F_c^H D_2^H R_{nn}^{-1} y; \quad \text{Equation 8}$$

$$\begin{bmatrix}H_1\\H_2\end{bmatrix} = \tilde{F}_c \left(\tilde{F}_c^H \tilde{D}^H R_{nn}^{-1} \tilde{D} \tilde{F}_c + R_{\tilde{h}\tilde{h}}^{-1}\right)^{-1} \tilde{F}_c^H \tilde{D}^H R_{nn}^{-1} y; \quad \text{Equation 9}$$

$$\text{where } \tilde{D} = [D_1 \; D_2]; \text{ and } \tilde{F}_c = \begin{bmatrix}F_c & 0\\0 & F_c\end{bmatrix}.$$

In Equations 5-9, y is a vector of a signal in a frequency domain of the full bandwidth as observed by a first receiver antenna and a second receiver antenna, D is a diagonal matrix of constellation points associated with the data of the data aided PT-RSs (e.g., including $s_1$ and $s_2$ of Equation 1), $F_c$ is a Fast Fourier Transform (FFT) matrix cut to rows and columns according to occupied subcarriers and a delay spread, h is a time domain channel response, $D_1$ and $D_2$ represent the data of the data aided PT-RSs from the first layer and the second layer, respectively, $$\begin{bmatrix} H_1 \\ H_2 \end{bmatrix}$$

represents channel estimation over the whole bandwidth for a first layer ($H_1$) and for a second layer ($H_2$), and $R_{hh}$ is a channel autocorrelation in a time domain. In some aspects, the delay spread may be determined from the DMRS.

Based at least in part on the UE indicating the capability to communicate using data aided PT-RSs and/or the UE requesting to communicate using data aided PT-RSs on multiple layers of the communication link, the base station and/or the UE may conserve computing, communication, and/or network resources that may otherwise have been used to schedule additional resources to compensate for using dedicated resources for PT-RSs.

As indicated above, FIG. 4 is provided as an example. Other examples may differ from what is described with respect to FIG. 4.

Figure 5:
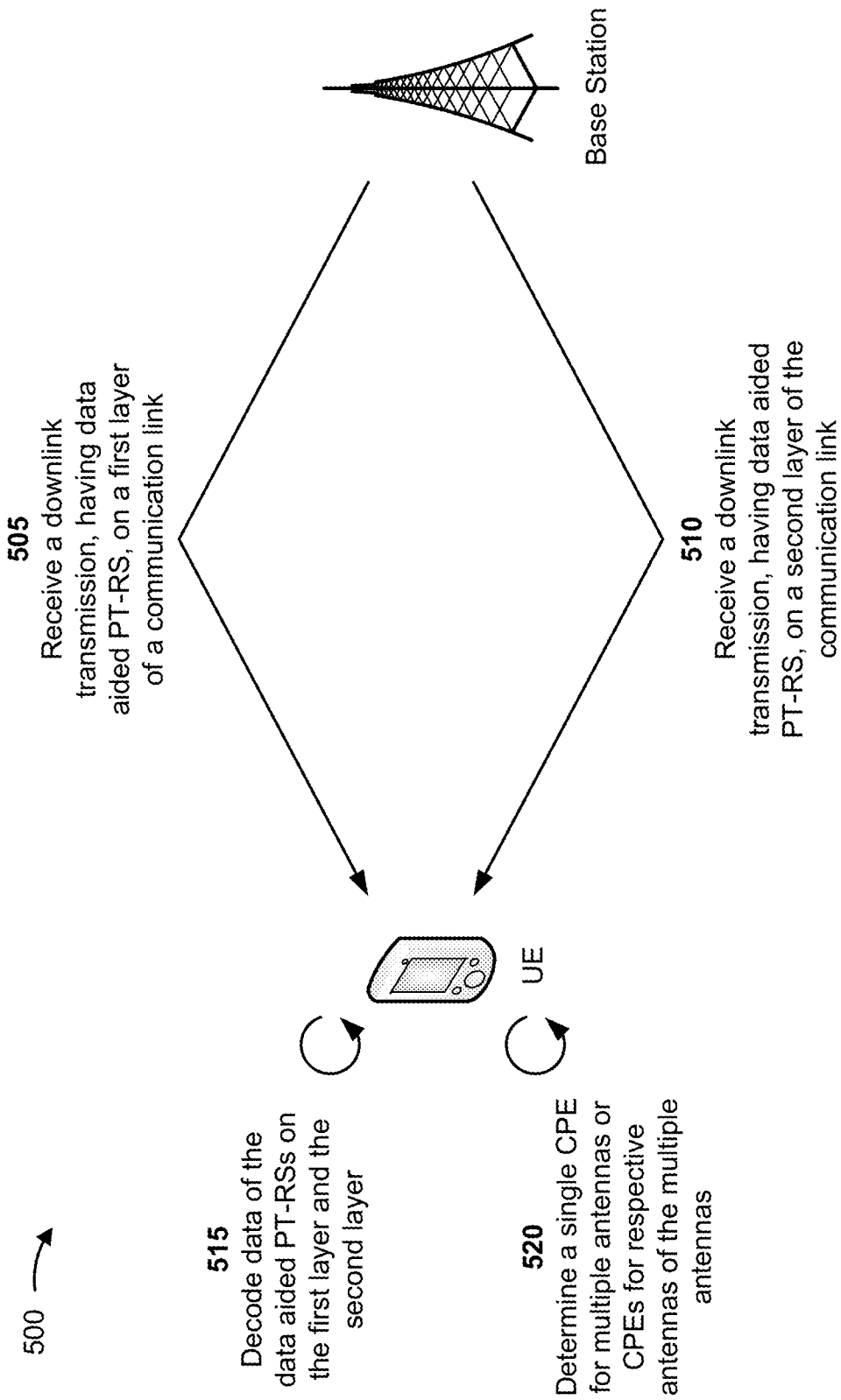
FIG. 5 is a diagram illustrating an example of user equipment initiated data aided phase tracking reference signals on multiple layers of a communication link, in accordance with the present disclosure.

FIG. 5 is a diagram illustrating an example 500 of UE initiated data aided PT-RSs on multiple layers of a communication link, in accordance with the present disclosure. As shown in FIG. 5, a UE (e.g., UE 120) may receive a downlink transmission from a base station (e.g., base station 110). The UE and the base station may be part of a wireless network (e.g., wireless network 100).

As shown in FIG. 5, and by reference number 505, the UE may receive a downlink transmission, having data aided PT-RS, on a first layer of a communication link. As shown by reference number 510, the UE may receive the downlink transmission, having data aided PT-RS, on a second layer of the communication link. In some aspects, the UE and the base station may agree to communicate downlink transmissions having data aided PT-RSs on multiple layers of the communication link, may assume downlink transmissions having data aided PT-RSs on multiple layers of the communication link, and/or the like, as described herein (e.g., with reference to FIG. 4).

As shown by reference number 515, the UE may decode data of the data aided PT-RSs on the first layer and on the second layer. In some aspects, the UE may re-encode the data of the data aided PT-RSs on the multiple layers of the communication link, re-modulate the data of the data aided PT-RSs, and/or the like after decoding. The UE may, for example, use DMRSs to decode the data.

As shown by reference number 520, the UE may determine a single CPE for multiple antennas or CPEs for respective antennas of the multiple antennas of the UE. In some aspects, the UE may determine the single CPE or the CPEs based at least in part on the data aided PT-RSs on the multiple layers of the communication link (e.g., using the decoded data, the re-encoded data, the re-modulated data, and/or the like). In some aspects, the UE may perform channel estimation based at least in part on the re-modulated data of the data aided PT-RSs. The UE may use the channel estimation to determine the single CPE or the CPEs for the antennas of the UE.

As described with reference to FIG. 4, the UE may descramble the data of the data aided PT-RSs on the multiple layers of the communication link, generate a soft data estimation per layer of the data aided PT-RSs, average the soft data estimation per layer, and/or the like to determine the one or more CPEs of the downlink transmission (e.g., for respective antennas of the UE).

As indicated above, FIG. 5 is provided as an example. Other examples may differ from what is described with respect to FIG. 5.

Figure 6:
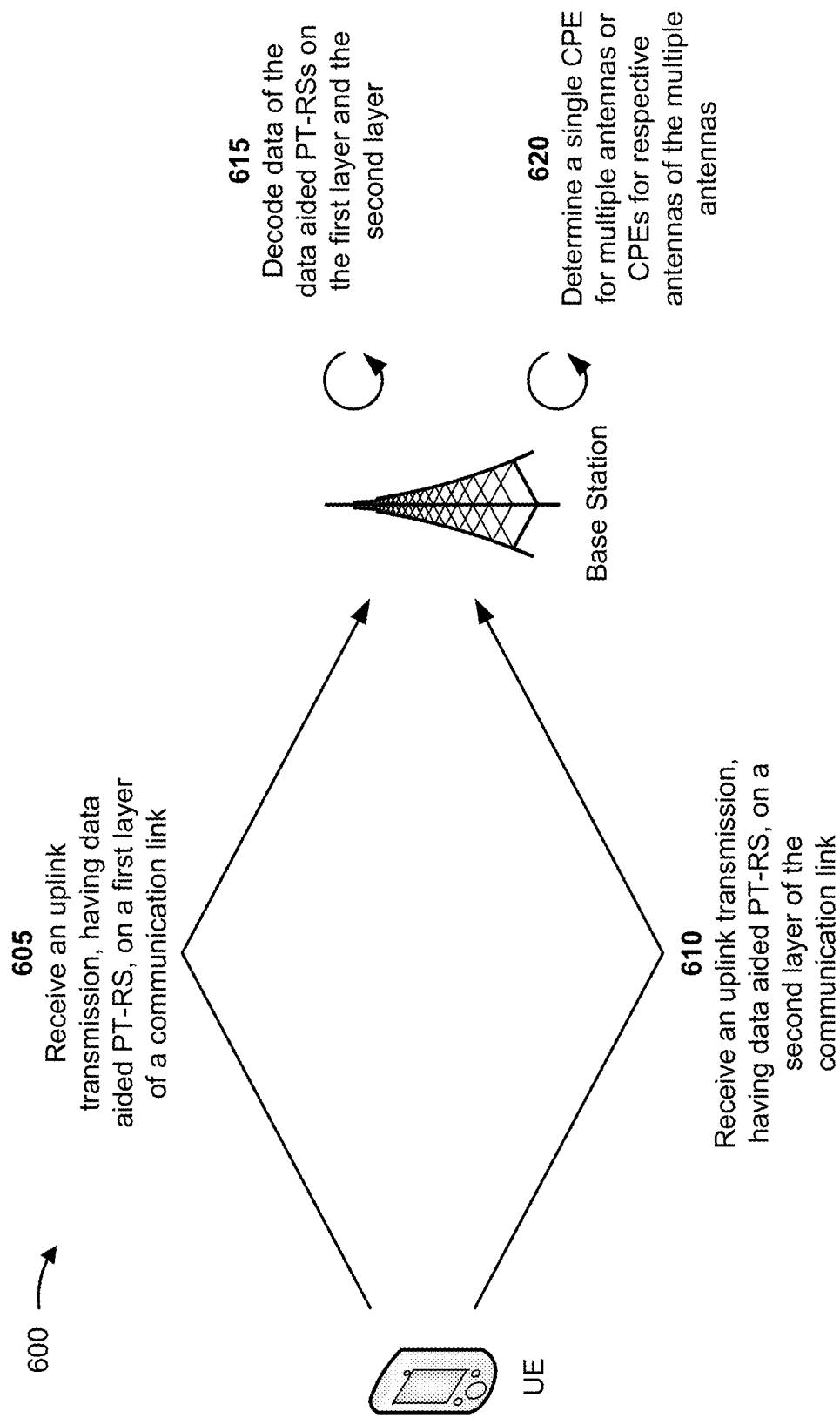
FIG. 6 is a diagram illustrating an example of user equipment initiated data aided phase tracking reference signals on multiple layers of a communication link, in accordance with the present disclosure.

FIG. 6 is a diagram illustrating an example 600 of UE initiated data aided PT-RSs on multiple layers of a communication link, in accordance with the present disclosure. As shown in FIG. 6, a base station (e.g., base station 110) may receive an uplink transmission from a UE (e.g., UE 120). The UE and the base station may be part of a wireless network (e.g., wireless network 100).

As shown in FIG. 6, and by reference number 605, the base station may receive an uplink transmission, having data aided PT-RS, on a first layer of a communication link. As shown by reference number 610, the base station may receive the uplink transmission, having data aided PT-RS, on a second layer of the communication link. In some aspects, the UE and the base station may agree to communicate uplink transmissions having data aided PT-RSs on multiple layers of the communication link, may assume uplink transmissions having data aided PT-RSs on multiple layers of the communication link, and/or the like, as described herein (e.g., with reference to FIG. 4).

As shown by reference number 615, the base station may decode data of the data aided PT-RSs on the first layer and on the second layer. In some aspects, the base station may re-encode the data of the data aided PT-RSs on the multiple layers of the communication link, re-modulate the data of the data aided PT-RSs, and/or the like after decoding. The base station may, for example, use DMRSs to decode the data.

As shown by reference number 620, the base station may determine a single CPE for multiple antennas or CPEs for respective antennas of the multiple antennas of the base station. In some aspects, the base station may determine the single CPE or the CPEs based at least in part on the data aided PT-RSs on the multiple layers of the communication link (e.g., using the decoded data, the re-encoded data, the re-modulated data, and/or the like). In some aspects, the base station may perform channel estimation based at least in part on the re-modulated data of the data aided PT-RSs. The base station may use the channel estimation to determine the single CPE or the CPEs for the antennas of the base station used to communicate with the UE.

As described with reference to processes of the UE in FIG. 4, the base station may descramble the data of the data aided PT-RSs on the multiple layers of the communication link, generate a soft data estimation per layer of the data aided PT-RSs, average the soft data estimation per layer, and/or the like to determine the one or more CPEs of the uplink transmission (e.g., for respective antennas of the base station).

As indicated above, FIG. 6 is provided as an example. Other examples may differ from what is described with respect to FIG. 6.

Figure 7:
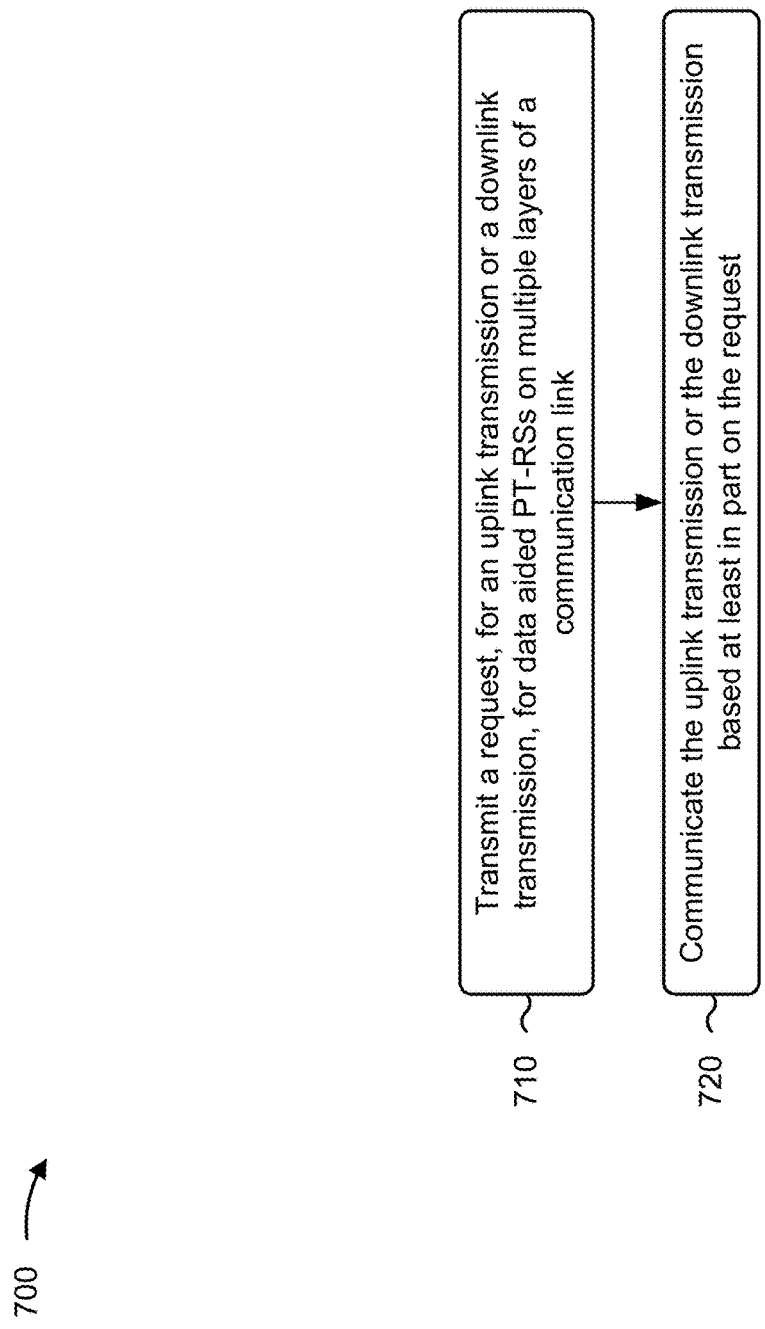
FIG. 7 is a diagram illustrating an example process performed, for example, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with UE initiated data aided PT-RSs on multiple layers of a communication link.

As shown in FIG. 7, in some aspects, process 700 may include transmitting a request, for an uplink transmission or a downlink transmission, for data aided PT-RSs on multiple layers of a communication link (block 710). For example, the UE (e.g., using transmit processor 264, controller/processor 280, memory 282, and/or the like) may transmit a request, for an uplink transmission or a downlink transmission, for data aided PT-RSs on multiple layers of a communication link, as described above.

As further shown in FIG. 7, in some aspects, process 700 may include communicating the uplink transmission or the downlink transmission based at least in part on the request (block 720). For example, the UE (e.g., using receive processor 258, transmit processor 264, controller/processor 280, memory 282, and/or the like) may communicate the uplink transmission or the downlink transmission based at least in part on the request, as described above.

Process 700 may include additional aspects, such as any single aspect or any combination of aspects described below and/or in connection with one or more other processes described elsewhere herein.

In a first aspect, process 700 includes receiving the downlink transmission; and determining, based at least in part on the data aided PT-RSs on the multiple layers of the communication link, one or more of a single CPE for multiple antennas associated with the multiple layers of the communication link, or CPEs for respective antennas of the multiple antennas.

In a second aspect, alone or in combination with the first aspect, determining the one or more of the single CPE for multiple antennas or the CPEs for respective antennas of the multiple antennas includes decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

In a third aspect, alone or in combination with one or more of the first and second aspects, decoding the data of the data aided PT-RSs on the multiple layers of the communication link includes decoding, based at least in part on one or more DMRS pilots, data of the data aided PT-RSs on the multiple layers of the communication link.

In a fourth aspect, alone or in combination with one or more of the first through third aspects, determining the one or more of the single CPE for multiple antennas or the CPEs for respective antennas of the multiple antennas includes generating, based at least in part on descrambling the data of the data aided PT-RSs on the multiple layers of the communication link, a soft data estimation per layer of the data aided PT-RSs on the multiple layers of the communication link, and determining, based at least in part on an average of the soft data estimation per layer, the one or more of the single CPE for multiple antennas or the CPEs for respective antennas of the multiple antennas.

In a fifth aspect, alone or in combination with one or more of the first through fourth aspects, data that is transmitted on resources associated with the data aided PT-RSs on multiple layers of the communication link have a CRC that is different from one or more CRCs associated with other data of the uplink transmission or the downlink transmission, and process 700 further comprises decoding the data using one or more of convolution codes, polar codes, or low-density parity-check codes.

In a sixth aspect, alone or in combination with one or more of the first through fifth aspects, the data aided PT-RSs on multiple layers of the communication link include a PT-RS sequence that is multiplexed with data.

In a seventh aspect, alone or in combination with one or more of the first through sixth aspects, the request comprises an indication of one or more of the multiple layers for data aided PT-RSs on the multiple layers of the communication link.

In an eighth aspect, alone or in combination with one or more of the first through seventh aspects, process 700 includes transmitting a request for an MCS for symbols associated with the data aided PT-RSs on the multiple layers of the communication link.

In a ninth aspect, alone or in combination with one or more of the first through eighth aspects, transmitting the request for the MCS includes transmitting the request for the MCS with the request for data aided PT-RSs on the multiple layers of the communication link.

In a tenth aspect, alone or in combination with one or more of the first through ninth aspects, the request for the MCS indicates a requested difference between the MCS for symbols associated with the data aided PT-RSs on the multiple layers of the communication link and an MCS for symbols associated with other data of the uplink transmission or the downlink transmission.

In an eleventh aspect, alone or in combination with one or more of the first through tenth aspects, process 700 includes receiving an indication of an MCS for symbols associated with the data aided PT-RSs on the multiple layers of the communication link.

In a twelfth aspect, alone or in combination with one or more of the first through eleventh aspects, process 700 includes decoding data that is multiplexed with a PT-RS sequence on resources associated with the data aided PT-RSs on the multiple layers of the communication link based at least in part on one or more of a configured indication of the multiple layers for data aided PT-RSs on the multiple layers of the communication link, or a configured difference of an MCS for data aided PT-RSs on the multiple layers of the communication link and an MCS for other data of the uplink transmission or the downlink transmission.

In a thirteenth aspect, alone or in combination with one or more of the first through twelfth aspects, process 700 includes transmitting an indication of a capability of the UE to communicate one or more of uplink transmissions or downlink transmissions with data aided PT-RSs on the multiple layers of the communication link.

In a fourteenth aspect, alone or in combination with one or more of the first through thirteenth aspects, transmitting the indication of the capability of the UE includes transmitting the indication via one or more of RRC signaling, a MAC CE, or a PUCCH message.

In a fifteenth aspect, alone or in combination with one or more of the first through fourteenth aspects, process 700 includes receiving configuration information that indicates that a base station is to provide an indication of whether data aided PT-RSs on the multiple layers of the communication link is enabled.

In a sixteenth aspect, alone or in combination with one or more of the first through fifteenth aspects, process 700 includes receiving an indication to communicate based at least in part on data aided PT-RSs on the multiple layers of the communication link.

In a seventeenth aspect, alone or in combination with one or more of the first through sixteenth aspects, receiving the indication includes receiving the indication via one or more of a downlink control information message, a MAC CE, or RRC signaling.

In an eighteenth aspect, alone or in combination with one or more of the first through seventeenth aspects, the indication to communicate based at least in part on data aided PT-RSs on the multiple layers of the communication link includes an indication of the multiple layers for data aided PT-RSs on the multiple layers of the communication link, or an indication of an MCS for data aided PT-RSs on the multiple layers of the communication link.

In a nineteenth aspect, alone or in combination with one or more of the first through eighteenth aspects, process 700 includes communicating the uplink transmission or the downlink transmission based at least in part on an assumption, based at least in part on transmitting the request, that the uplink transmission or the downlink transmission is to be transmitted with data aided PT-RSs on the multiple layers of the communication link.

In a twentieth aspect, alone or in combination with one or more of the first through nineteenth aspects, data transmitted on resources associated with the data aided PT-RSs on the multiple layers of the communication link is associated with a dedicated ACK/NACK bit that is different from one or more ACK/NACK bits that are associated with other data communicated via the uplink transmission or the downlink transmission.

In a twenty-first aspect, alone or in combination with one or more of the first through twentieth aspects, process 700 includes reporting a NACK for the data aided PT-RSs on the multiple layers of the communication link; and receiving a repetition of the data aided PT-RSs on the multiple layers of the communication link via a subsequent PT-RS resource.

In a twenty-second aspect, alone or in combination with one or more of the first through twenty-first aspects, the request includes an indication of a capability of the UE to communicate one or more of uplink transmissions or downlink transmissions with data aided PT-RSs on the multiple layers of the communication link.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
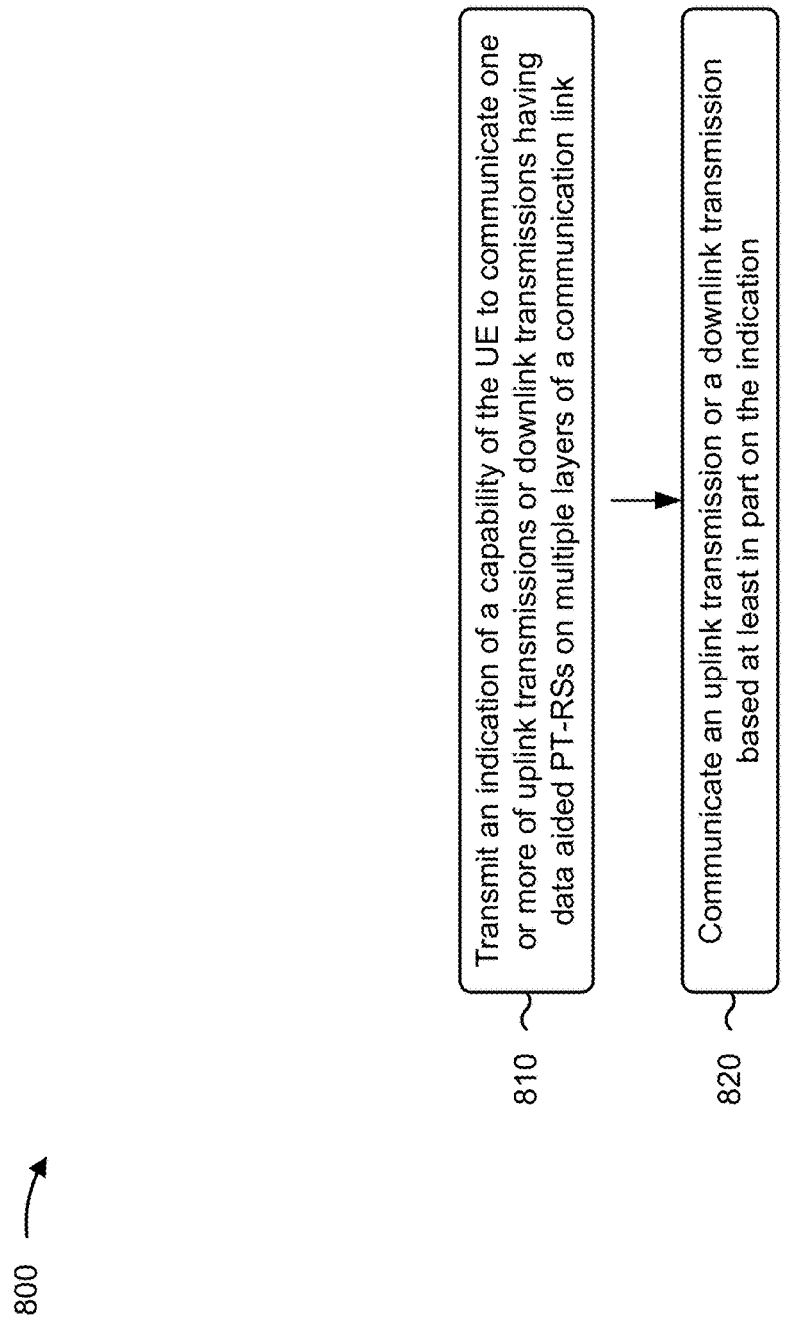
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with UE initiated data aided PT-RSs on multiple layers of a communication link.

As shown in FIG. 8, in some aspects, process 800 may include transmitting an indication of a capability of the UE to communicate one or more of uplink transmissions or downlink transmissions having data aided PT-RSs on multiple layers of a communication link (block 810). For example, the UE (e.g., using transmit processor 264, controller/processor 280, memory 282, and/or the like) may transmit an indication of a capability of the UE to communicate one or more of uplink transmissions or downlink transmissions having data aided PT-RSs on multiple layers of a communication link, as described above.

As further shown in FIG. 8, in some aspects, process 800 may include communicating an uplink transmission or a downlink transmission based at least in part on the indication (block 820). For example, the UE (e.g., using receive processor 258, transmit processor 264, controller/processor 280, memory 282, and/or the like) may communicate an uplink transmission or a downlink transmission based at least in part on the indication, as described above.

Process 800 may include additional aspects, such as any single aspect or any combination of aspects described below and/or in connection with one or more other processes described elsewhere herein.

In a first aspect, transmitting the indication of the capability of the UE includes transmitting the indication via one or more of RRC signaling, a MAC CE, or a PUCCH message.

In a second aspect, alone or in combination with the first aspect, process 800 includes transmitting a request, for the uplink transmission or the downlink transmission, for data aided PT-RSs on the multiple layers of the communication link.

In a third aspect, alone or in combination with one or more of the first and second aspects, the request comprises an indication of one or more of the multiple layers for data aided PT-RSs on the multiple layers of the communication link.

In a fourth aspect, alone or in combination with one or more of the first through third aspects, process 800 includes receiving the downlink transmission; and determining, based at least in part on the data aided PT-RSs on the multiple layers of the communication link, one or more of a single CPE for multiple antennas associated with the multiple layers of the communication link, or CPEs for respective antennas of the multiple antennas.

In a fifth aspect, alone or in combination with one or more of the first through fourth aspects, determining the one or more of the single CPE for multiple antennas or the CPEs for respective antennas of the multiple antennas includes decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

In a sixth aspect, alone or in combination with one or more of the first through fifth aspects, decoding the data of the data aided PT-RSs on the multiple layers of the communication link includes decoding, based at least in part on one or more DMRS pilots, data of the data aided PT-RSs on the multiple layers of the communication link.

In a seventh aspect, alone or in combination with one or more of the first through sixth aspects, determining the one or more of the single CPE for multiple antennas or the CPEs for respective antennas of the multiple antennas includes generating, based at least in part on descrambling the data of the data aided PT-RSs on the multiple layers of the communication link, a soft data estimation per layer of the data aided PT-RSs on the multiple layers of the communication link, and determining, based at least in part on an average of the soft data estimation per layer, the one or more of the single CPE for multiple antennas or the CPEs for respective antennas of the multiple antennas.

In an eighth aspect, alone or in combination with one or more of the first through seventh aspects, data that is transmitted on resources associated with the data aided PT-RSs on the multiple layers of the communication link have a CRC that is different from one or more CRCs associated with other data of the uplink transmission or the downlink transmission, and process 800 further comprises decoding the data using one or more of convolution codes, polar codes, or low-density parity-check codes.

In a ninth aspect, alone or in combination with one or more of the first through eighth aspects, the data aided PT-RSs on the multiple layers of the communication link include a PT-RS sequence that is multiplexed with data.

In a tenth aspect, alone or in combination with one or more of the first through ninth aspects, process 800 includes transmitting a request for an MCS for symbols associated with the data aided PT-RSs on the multiple layers of the communication link.

In an eleventh aspect, alone or in combination with one or more of the first through tenth aspects, transmitting the request for the MCS includes transmitting the request for the MCS with the request for data aided PT-RSs on the multiple layers of the communication link.

In a twelfth aspect, alone or in combination with one or more of the first through eleventh aspects, the request for the MCS indicates a requested difference between the MCS for symbols associated with the data aided PT-RSs on the multiple layers of the communication link and an MCS for symbols associated with other data of the uplink transmission or the downlink transmission.

In a thirteenth aspect, alone or in combination with one or more of the first through twelfth aspects, process 800 includes receiving an indication of an MCS for symbols associated with the data aided PT-RSs on the multiple layers of the communication link.

In a fourteenth aspect, alone or in combination with one or more of the first through thirteenth aspects, process 800 includes decoding data that is multiplexed with a PT-RS sequence on resources associated with the data aided PT-RSs on the multiple layers of the communication link based at least in part on one or more of a configured indication of the multiple layers for data aided PT-RSs on the multiple layers of the communication link, or a configured difference of an MCS for data aided PT-RSs on the multiple layers of the communication link and an MCS for other data of the uplink transmission or the downlink transmission.

In a fifteenth aspect, alone or in combination with one or more of the first through fourteenth aspects, process 800 includes transmitting an indication of a capability of the UE to communicate one or more of uplink transmissions or downlink transmissions with data aided PT-RSs on the multiple layers of the communication link.

In a sixteenth aspect, alone or in combination with one or more of the first through fifteenth aspects, transmitting the indication of the capability of the UE includes transmitting the indication via one or more of RRC signaling, a MAC CE, or a PUCCH message.

In a seventeenth aspect, alone or in combination with one or more of the first through sixteenth aspects, process 800 includes receiving configuration information that indicates that a base station is to provide an indication of whether data aided PT-RSs on the multiple layers of the communication link is enabled.

In an eighteenth aspect, alone or in combination with one or more of the first through seventeenth aspects, process 800 includes receiving an indication to communicate based at least in part on data aided PT-RSs on the multiple layers of the communication link.

In a nineteenth aspect, alone or in combination with one or more of the first through eighteenth aspects, receiving the indication includes receiving the indication via one or more of a downlink control information message, a MAC CE, or RRC signaling.

In a twentieth aspect, alone or in combination with one or more of the first through nineteenth aspects, the indication to communicate based at least in part on data aided PT-RSs on the multiple layers of the communication link includes an indication of the multiple layers for data aided PT-RSs on the multiple layers of the communication link, or an indication of an MCS for data aided PT-RSs on the multiple layers of the communication link.

In a twenty-first aspect, alone or in combination with one or more of the first through twentieth aspects, process 800 includes communicating the uplink transmission or the downlink transmission based at least in part on an assumption, based at least in part on transmitting the indication, that the uplink transmission or the downlink transmission is to be transmitted with data aided PT-RSs on the multiple layers of the communication link.

In a twenty-second aspect, alone or in combination with one or more of the first through twenty-first aspects, data transmitted on resources associated with the data aided PT-RSs on the multiple layers of the communication link is associated with a dedicated ACK/NACK bit that is different from one or more ACK/NACK bits that are associated with other data communicated via the uplink transmission or the downlink transmission.

In a twenty-third aspect, alone or in combination with one or more of the first through twenty-second aspects, process 800 includes reporting a NACK for the data aided PT-RSs on the multiple layers of the communication link; and receiving a repetition of the data aided PT-RSs on the multiple layers of the communication link via a subsequent PT-RS resource.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
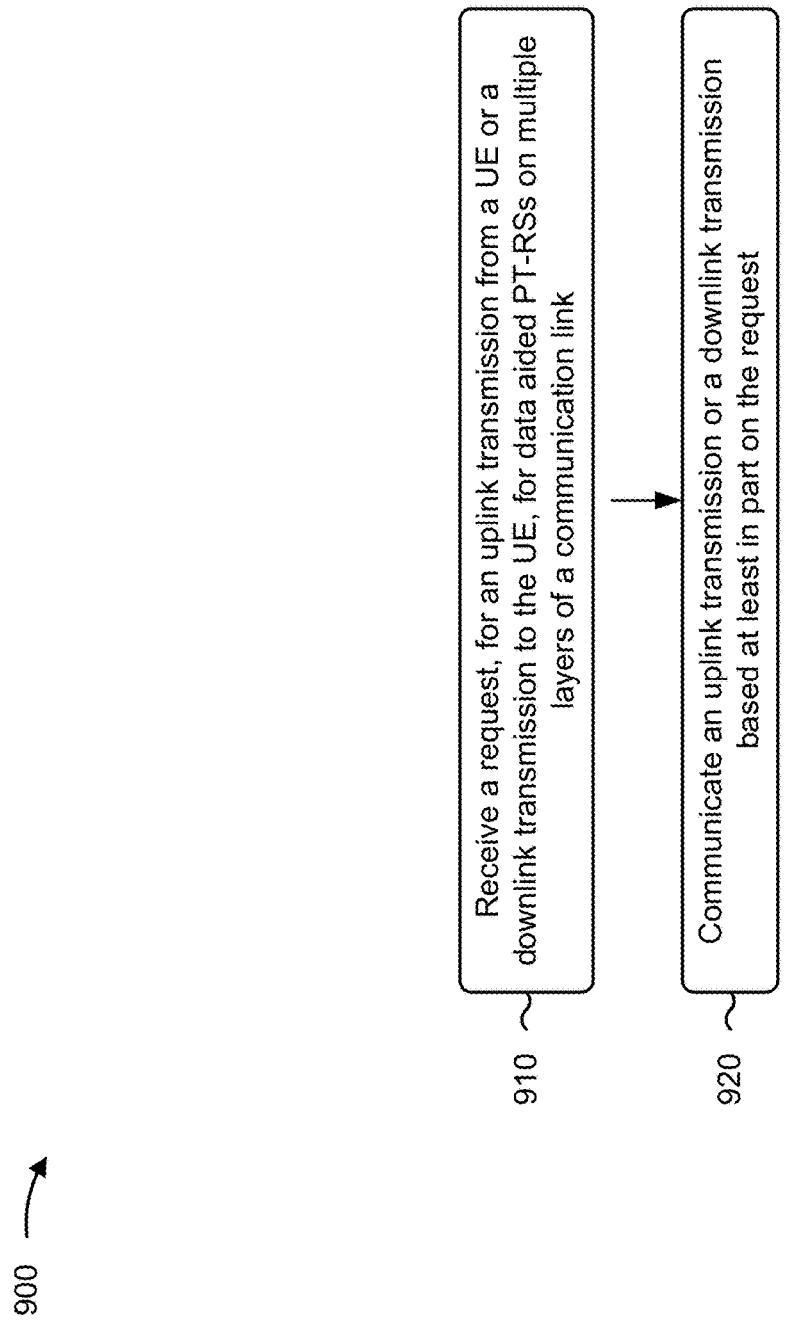
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., base station 110 and/or the like) performs operations associated with UE initiated data aided PT-RSs on multiple layers of a communication link.

As shown in FIG. 9, in some aspects, process 900 may include receiving a request, for an uplink transmission from a UE or a downlink transmission to the UE, for data aided PT-RSs on multiple layers of a communication link (block 910). For example, the base station (e.g., using receive processor 238, controller/processor 240, memory 242, and/or the like) may receive a request, for an uplink transmission from a UE or a downlink transmission to the UE, for data aided PT-RSs on multiple layers of a communication link, as described above.

As further shown in FIG. 9, in some aspects, process 900 may include communicating an uplink transmission or a downlink transmission based at least in part on the request (block 920). For example, the base station (e.g., using transmit processor 220, receive processor 238, controller/ processor 240, memory 242, and/or the like) may communicate an uplink transmission or a downlink transmission based at least in part on the request, as described above.

Process 900 may include additional aspects, such as any single aspect or any combination of aspects described below and/or in connection with one or more other processes described elsewhere herein.

In a first aspect, process 900 includes determining whether to transmit the downlink transmission with data aided PT-RSs on the multiple layers of the communication link based at least in part on one or more of a request from the UE to communicate with data aided PT-RSs on the multiple layers of the communication link, an amount of data buffered for the downlink transmission, a size of a resource grant associated with the downlink transmission, a reference signal receive power associated with the UE, or movement of the UE.

In a second aspect, alone or in combination with the first aspect, process 900 includes receiving the uplink transmission; and determining, based at least in part on the data aided PT-RSs on the multiple layers of the communication link, one or more of a single CPE for multiple antennas associated with the multiple layers of the communication link, or CPEs for respective antennas of the multiple antennas.

In a third aspect, alone or in combination with one or more of the first and second aspects, determining the one or more of the single CPE for multiple antennas or the CPEs for respective antennas of the multiple antennas includes decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

In a fourth aspect, alone or in combination with one or more of the first through third aspects, decoding the data of the data aided PT-RSs on the multiple layers of the communication link includes decoding, based at least in part on one or more DMRS pilots, data of the data aided PT-RSs on the multiple layers of the communication link.

In a fifth aspect, alone or in combination with one or more of the first through fourth aspects, determining the one or more of the single CPE for multiple antennas or the CPEs for respective antennas of the multiple antennas includes generating, based at least in part on descrambling the data of the data aided PT-RSs on the multiple layers of the communication link, a soft data estimation per layer of the data aided PT-RSs on the multiple layers of the communication link, and determining, based at least in part on an average of the soft data estimation per layer, the one or more of the single CPE for multiple antennas or the CPEs for respective antennas of the multiple antennas.

In a sixth aspect, alone or in combination with one or more of the first through fifth aspects, data that is transmitted on resources associated with the data aided PT-RSs on the multiple layers of the communication link have a CRC that is different from one or more CRCs associated with other data of the uplink transmission or the downlink transmission, and process 900 further comprises decoding the data using one or more of convolution codes, polar codes, or low-density parity-check codes.

In a seventh aspect, alone or in combination with one or more of the first through sixth aspects, the data aided PT-RSs on the multiple layers of the communication link include a PT-RS sequence that is multiplexed with data.

In an eighth aspect, alone or in combination with one or more of the first through seventh aspects, the request comprises an indication of one or more of the multiple layers for data aided PT-RSs on the multiple layers of the communication link.

In a ninth aspect, alone or in combination with one or more of the first through eighth aspects, process 900 includes receiving a request for an MCS for symbols associated with the data aided PT-RSs on the multiple layers of the communication link.

In a tenth aspect, alone or in combination with one or more of the first through ninth aspects, receiving the request for the MCS includes receiving the request for the MCS with the request for data aided PT-RSs on the multiple layers of the communication link.

In an eleventh aspect, alone or in combination with one or more of the first through tenth aspects, the request for the MCS indicates a requested difference between the MCS for symbols associated with the data aided PT-RSs on the multiple layers of the communication link and an MCS for symbols associated with other data of the uplink transmission or the downlink transmission.

In a twelfth aspect, alone or in combination with one or more of the first through eleventh aspects, process 900 includes transmitting an indication of an MCS for symbols associated with the data aided PT-RSs on the multiple layers of the communication link.

In a thirteenth aspect, alone or in combination with one or more of the first through twelfth aspects, process 900 includes decoding data that is multiplexed with a PT-RS sequence on resources associated with the data aided PT-RSs on the multiple layers of the communication link based at least in part on one or more of a configured indication of the multiple layers for data aided PT-RSs on the multiple layers of the communication link, or a configured difference of an MCS for data aided PT-RSs on the multiple layers of the communication link and an MCS for other data of the uplink transmission or the downlink transmission.

In a fourteenth aspect, alone or in combination with one or more of the first through thirteenth aspects, process 900 includes receiving an indication of a capability of the UE to communicate one or more of uplink transmissions or downlink transmissions with data aided PT-RSs on the multiple layers of the communication link.

In a fifteenth aspect, alone or in combination with one or more of the first through fourteenth aspects, receiving the indication of the capability of the UE includes receiving the indication via one or more of RRC signaling, a MAC CE, or a PUCCH message.

In a sixteenth aspect, alone or in combination with one or more of the first through fifteenth aspects, process 900 includes transmitting configuration information that indicates that the base station is to provide an indication of whether data aided PT-RSs on the multiple layers of the communication link is enabled.

In a seventeenth aspect, alone or in combination with one or more of the first through sixteenth aspects, process 900 includes transmitting an indication to communicate based at least in part on data aided PT-RSs on the multiple layers of the communication link.

In an eighteenth aspect, alone or in combination with one or more of the first through seventeenth aspects, transmitting the indication includes transmitting the indication via one or more of a downlink control information message, a MAC CE, or RRC signaling.

In a nineteenth aspect, alone or in combination with one or more of the first through eighteenth aspects, the indication to communicate based at least in part on data aided PT-RSs on the multiple layers of the communication link includes an indication of the multiple layers for data aided PT-RSs on the multiple layers of the communication link, or an indication of an MCS for data aided PT-RSs on the multiple layers of the communication link.

In a twentieth aspect, alone or in combination with one or more of the first through nineteenth aspects, process 900 includes communicating the uplink transmission or the downlink transmission based at least in part on an assumption, based at least in part on receiving the request, that the uplink transmission or the downlink transmission is to be transmitted with data aided PT-RSs on the multiple layers of the communication link.

In a twenty-first aspect, alone or in combination with one or more of the first through twentieth aspects, data transmitted on resources associated with the data aided PT-RSs on the multiple layers of the communication link is associated with a dedicated ACK/NACK bit that is different from one or more ACK/NACK bits that are associated with other data communicated via the uplink transmission or the downlink transmission.

In a twenty-second aspect, alone or in combination with one or more of the first through twenty-first aspects, process 900 includes receiving a NACK for the data aided PT-RSs on the multiple layers of the communication link; and transmitting a repetition of the data aided PT-RSs on the multiple layers of the communication link via a subsequent PT-RS resource.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
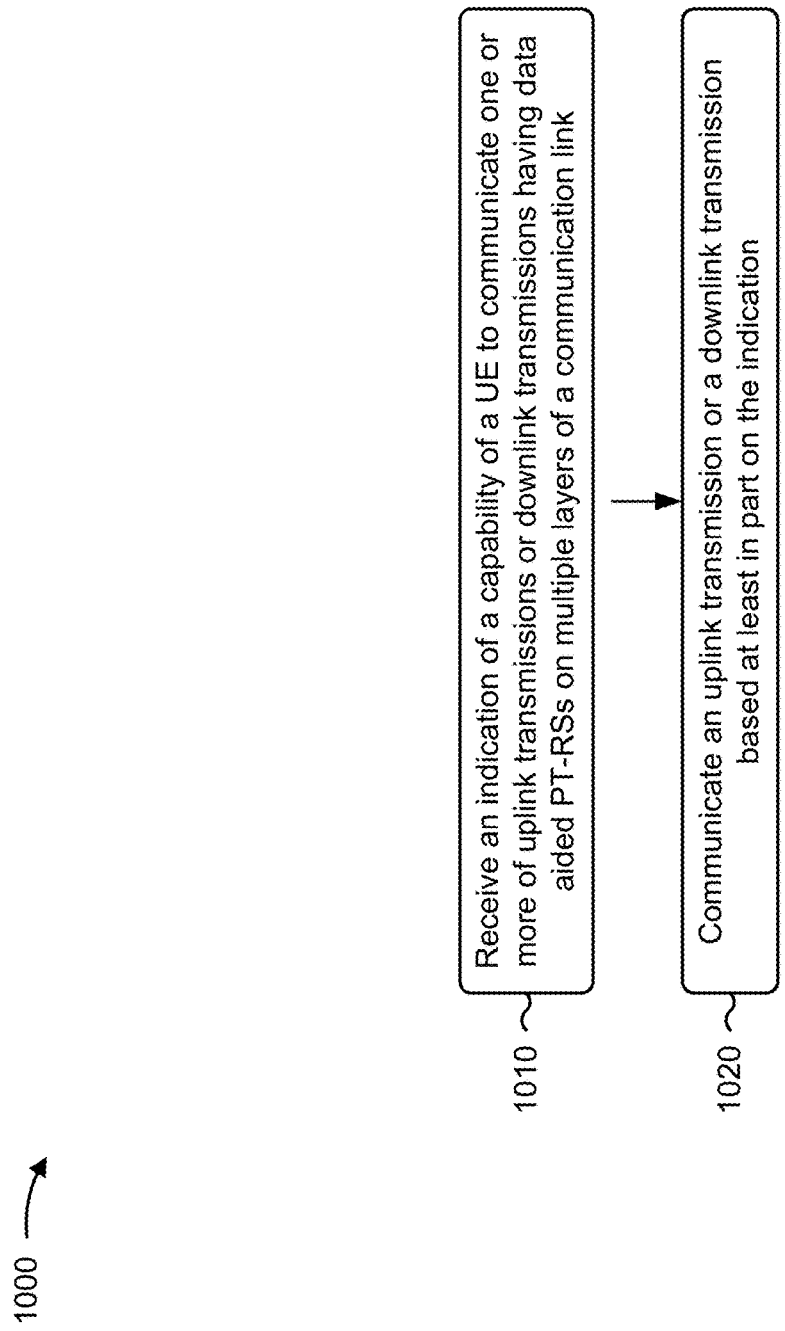
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110 and/or the like) performs operations associated with UE initiated data aided PT-RSs on multiple layers of a communication link.

As shown in FIG. 10, in some aspects, process 1000 may include receiving an indication of a capability of a UE to communicate one or more of uplink transmissions or downlink transmissions having data aided PT-RSs on multiple layers of a communication link (block 1010). For example, the base station (e.g., using receive processor 238, controller/processor 240, memory 242, and/or the like) may receive an indication of a capability of a UE to communicate one or more of uplink transmissions or downlink transmissions having data aided PT-RSs on multiple layers of a communication link, as described above.

As further shown in FIG. 10, in some aspects, process 1000 may include communicating an uplink transmission or a downlink transmission based at least in part on the indication (block 1020). For example, the base station (e.g., using transmit processor 220, receive processor 238, controller/processor 240, memory 242, and/or the like) may communicate an uplink transmission or a downlink transmission based at least in part on the indication, as described above.

Process 1000 may include additional aspects, such as any single aspect or any combination of aspects described below and/or in connection with one or more other processes described elsewhere herein.

In a first aspect, process 1000 includes determining whether to transmit the downlink transmission with data aided PT-RSs on the multiple layers of the communication link based at least in part on one or more of a request from the UE to communicate with data aided PT-RSs on the multiple layers of the communication link, an amount of data buffered for the downlink transmission, a size of a resource grant associated with the downlink transmission, a reference signal receive power associated with the UE, or movement of the UE.

In a second aspect, alone or in combination with the first aspect, receiving the indication of the capability of the UE includes receiving the indication via one or more of RRC signaling, a MAC CE, or a PUCCH message.

In a third aspect, alone or in combination with one or more of the first and second aspects, process 1000 includes receiving a request, for the uplink transmission or the downlink transmission, for data aided PT-RSs on the multiple layers of the communication link.

In a fourth aspect, alone or in combination with one or more of the first through third aspects, the request comprises an indication of one or more of the multiple layers for data aided PT-RSs on the multiple layers of the communication link.

In a fifth aspect, alone or in combination with one or more of the first through fourth aspects, process 1000 includes receiving the uplink transmission; and determining, based at least in part on the data aided PT-RSs on the multiple layers of the communication link, one or more of a single CPE for multiple antennas associated with the multiple layers of the communication link, or CPEs for respective antennas of the multiple antennas.

In a sixth aspect, alone or in combination with one or more of the first through fifth aspects, determining the one or more of the single CPE for multiple antennas or the CPEs for respective antennas of the multiple antennas includes decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

In a seventh aspect, alone or in combination with one or more of the first through sixth aspects, decoding the data of the data aided PT-RSs on the multiple layers of the communication link includes decoding, based at least in part on one or more DMRS pilots, data of the data aided PT-RSs on the multiple layers of the communication link.

In an eighth aspect, alone or in combination with one or more of the first through seventh aspects, determining the one or more of the single CPE for multiple antennas or the CPEs for respective antennas of the multiple antennas includes generating, based at least in part on descrambling the data of the data aided PT-RSs on the multiple layers of the communication link, a soft data estimation per layer of the data aided PT-RSs on the multiple layers of the communication link, and determining, based at least in part on an average of the soft data estimation per layer, the one or more of the single CPE for multiple antennas or the CPEs for respective antennas of the multiple antennas.

In a ninth aspect, alone or in combination with one or more of the first through eighth aspects, data that is transmitted on resources associated with the data aided PT-RSs on the multiple layers of the communication link have a CRC that is different from one or more CRCs associated with other data of the uplink transmission or the downlink transmission, and process 1000 further comprises decoding the data using one or more of convolution codes, polar codes, or low-density parity-check codes.

In a tenth aspect, alone or in combination with one or more of the first through ninth aspects, the data aided PT-RSs on the multiple layers of the communication link include a PT-RS sequence that is multiplexed with data.

In an eleventh aspect, alone or in combination with one or more of the first through tenth aspects, process 1000 includes receiving a request for an MCS for symbols associated with the data aided PT-RSs on the multiple layers of the communication link.

In a twelfth aspect, alone or in combination with one or more of the first through eleventh aspects, receiving the request for the MCS includes receiving the request for the MCS with the request for data aided PT-RSs on the multiple layers of the communication link.

In a thirteenth aspect, alone or in combination with one or more of the first through twelfth aspects, the request for the MCS indicates a requested difference between the MCS for symbols associated with the data aided PT-RSs on the multiple layers of the communication link and an MCS for symbols associated with other data of the uplink transmission or the downlink transmission.

In a fourteenth aspect, alone or in combination with one or more of the first through thirteenth aspects, process 1000 includes transmitting an indication of an MCS for symbols associated with the data aided PT-RSs on the multiple layers of the communication link.

In a fifteenth aspect, alone or in combination with one or more of the first through fourteenth aspects, process 1000 includes decoding data that is multiplexed with a PT-RS sequence on resources associated with the data aided PT-RSs on the multiple layers of the communication link based at least in part on one or more of a configured indication of the multiple layers for data aided PT-RSs on the multiple layers of the communication link, or a configured difference of an MCS for data aided PT-RSs on the multiple layers of the communication link and an MCS for other data of the uplink transmission or the downlink transmission.

In a sixteenth aspect, alone or in combination with one or more of the first through fifteenth aspects, process 1000 includes receiving an indication of a capability of the UE to communicate one or more of uplink transmissions or downlink transmissions with data aided PT-RSs on the multiple layers of the communication link.

In a seventeenth aspect, alone or in combination with one or more of the first through sixteenth aspects, receiving the indication of the capability of the UE includes receiving the indication via one or more of RRC signaling, a MAC CE, or a PUCCH message.

In an eighteenth aspect, alone or in combination with one or more of the first through seventeenth aspects, process 1000 includes transmitting configuration information that indicates that the base station is to provide an indication of whether data aided PT-RSs on the multiple layers of the communication link is enabled.

In a nineteenth aspect, alone or in combination with one or more of the first through eighteenth aspects, process 1000 includes transmitting an indication to communicate based at least in part on data aided PT-RSs on the multiple layers of the communication link.

In a twentieth aspect, alone or in combination with one or more of the first through nineteenth aspects, transmitting the indication includes transmitting the indication via one or more of a downlink control information message, a MAC CE, or RRC signaling.

In a twenty-first aspect, alone or in combination with one or more of the first through twentieth aspects, the indication to communicate based at least in part on data aided PT-RSs on the multiple layers of the communication link includes an indication of the multiple layers for data aided PT-RSs on the multiple layers of the communication link, or an indication of an MCS for data aided PT-RSs on the multiple layers of the communication link.

In a twenty-second aspect, alone or in combination with one or more of the first through twenty-first aspects, process 1000 includes communicating the uplink transmission or the downlink transmission based at least in part on an assumption, based at least in part on receiving the indication, that the uplink transmission or the downlink transmission is to be transmitted with data aided PT-RSs on the multiple layers of the communication link.

In a twenty-third aspect, alone or in combination with one or more of the first through twenty-second aspects, data transmitted on resources associated with the data aided PT-RSs on the multiple layers of the communication link is associated with a dedicated ACK/NACK bit that is different from one or more ACK/NACK bits that are associated with other data communicated via the uplink transmission or the downlink transmission.

In a twenty-fourth aspect, alone or in combination with one or more of the first through twenty-third aspects, process 1000 includes receiving a NACK for the data aided PT-RSs on the multiple layers of the communication link; and receiving a repetition of the data aided PT-RSs on the multiple layers of the communication link via a subsequent PT-RS resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: transmitting a request, for an uplink transmission or a downlink transmission, for data aided phase tracking reference signals (PT-RSs) on multiple layers of a communication link; and communicating the uplink transmission or the downlink transmission based at least in part on the request.

Aspect 2: The method of Aspect 1, further comprising: receiving the downlink transmission; and determining, based at least in part on the data aided PT-RSs on the multiple layers of the communication link, one or more of: a single common phase error (CPE) for multiple antennas associated with the multiple layers of the communication link, or CPEs for respective antennas of the multiple antennas.

Aspect 3: The method of Aspect 2, wherein determining the one or more of the single CPE for multiple antennas or the CPEs for respective antennas of the multiple antennas comprises: decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

Aspect 4: The method of Aspect 3, wherein decoding the data of the data aided PT-RSs on the multiple layers of the communication link comprises: decoding, based at least in part on one or more demodulation reference signal pilots, data of the data aided PT-RSs on the multiple layers of the communication link.

Aspect 5: The method of Aspect 2, wherein determining the one or more of the single CPE for multiple antennas or the CPEs for respective antennas of the multiple antennas comprises: generating, based at least in part on descrambling the data of the data aided PT-RSs on the multiple layers of the communication link, a soft data estimation per layer of the data aided PT-RSs on the multiple layers of the communication link; and determining, based at least in part on an average of the soft data estimation per layer, the one or more of the single CPE for multiple antennas or the CPEs for respective antennas of the multiple antennas.

Aspect 6: The method of any of Aspects 1-5, wherein data that is transmitted on resources associated with the data aided PT-RSs on multiple layers of the communication link have a cyclical redundancy check (CRC) that is different from one or more CRCs associated with other data of the uplink transmission or the downlink transmission, and wherein the method further comprises decoding the data using one or more of convolution codes, polar codes, or low-density parity-check codes.

Aspect 7: The method of any of Aspects 1-6, wherein the data aided PT-RSs on multiple layers of the communication link include a PT-RS sequence that is multiplexed with data.

Aspect 8: The method of any of Aspects 1-7, wherein the request comprises an indication of one or more of the multiple layers for data aided PT-RSs on the multiple layers of the communication link.

Aspect 9: The method of any of Aspects 1-8, further comprising: transmitting a request for a modulation and coding scheme for symbols associated with the data aided PT-RSs on the multiple layers of the communication link.

Aspect 10: The method of Aspect 9, wherein transmitting the request for the modulation and coding scheme comprises: transmitting the request for the modulation and coding scheme with the request for data aided PT-RSs on the multiple layers of the communication link.

Aspect 11: The method of any of Aspects 8-9, wherein the request for the modulation and coding scheme indicates a requested difference between the modulation and coding scheme for symbols associated with the data aided PT-RSs on the multiple layers of the communication link and a modulation and coding scheme for symbols associated with other data of the uplink transmission or the downlink transmission.

Aspect 12: The method of any of Aspects 1-7, further comprising: receiving an indication of a modulation and coding scheme for symbols associated with the data aided PT-RSs on the multiple layers of the communication link.

Aspect 13, The method of Aspect 12, wherein the indication of the modulation and coding scheme indicates a difference between the modulation and coding scheme for symbols associated with the data aided PT-RSs and a modulation and coding scheme for symbols associated with other data of the uplink transmission or the downlink transmission.

Aspect 14: The method of any of Aspects 1-13, further comprising: decoding data that is multiplexed with a PT-RS sequence on resources associated with the data aided PT-RSs on the multiple layers of the communication link based at least in part on one or more of: a configured indication of the multiple layers for data aided PT-RSs on the multiple layers of the communication link, or a configured difference of a modulation and coding scheme for data aided PT-RSs on the multiple layers of the communication link and a modulation and coding scheme for other data of the uplink transmission or the downlink transmission.

Aspect 15: The method of any of Aspects 1-14, further comprising: transmitting an indication of a capability of the UE to communicate one or more of uplink transmissions or downlink transmissions with data aided PT-RSs on the multiple layers of the communication link.

Aspect 16: The method of Aspect 15, wherein transmitting the indication of the capability of the UE comprises: transmitting the indication via one or more of radio resource control signaling, a medium access control element, or a physical uplink control channel message.

Aspect 17: The method of any of Aspects 1-16, wherein the request includes an indication of a capability of the UE to communicate one or more of uplink transmissions or downlink transmissions with data aided PT-RSs on the multiple layers of the communication link.

Aspect 18: The method of any of Aspects 1-17, further comprising: receiving configuration information that indicates that a base station is to provide an indication of whether data aided PT-RSs on the multiple layers of the communication link is enabled.

Aspect 19: The method of any of Aspects 1-18, further comprising: receiving an indication to communicate based at least in part on data aided PT-RSs on the multiple layers of the communication link.

Aspect 20: The method of Aspect 19, wherein receiving the indication comprises: receiving the indication via one or more of: a downlink control information message, a medium access control element, or radio resource control signaling.

Aspect 21: The method of any of Aspects 19-20, wherein the indication to communicate based at least in part on data aided PT-RSs on the multiple layers of the communication link comprises: an indication of the multiple layers for data aided PT-RSs on the multiple layers of the communication link, or an indication of a modulation and coding scheme for data aided PT-RSs on the multiple layers of the communication link.

Aspect 22: The method of any of Aspects 1-21, further comprising: communicating the uplink transmission or the downlink transmission based at least in part on an assumption, based at least in part on transmitting the request, that the uplink transmission or the downlink transmission is to be transmitted with data aided PT-RSs on the multiple layers of the communication link.

Aspect 23: The method of any of Aspects 1-22, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

Aspect 24: The method of Aspect 23, further comprising: reporting a NACK for the data aided PT-RSs on the multiple layers of the communication link; and receiving a repetition of the data aided PT-RSs on the multiple layers of the communication link via a subsequent PT-RS resource.

Aspect 25: A method of wireless communication performed by a user equipment (UE), comprising: transmitting an indication of a capability of the UE to communicate one or more of uplink transmissions or downlink transmissions having data aided phase tracking reference signals (PT-RSs) on multiple layers of a communication link; and communicating an uplink transmission or a downlink transmission based at least in part on the indication.

Aspect 26: The method of Aspect 25, wherein transmitting the indication of the capability of the UE comprises: transmitting the indication via one or more of radio resource control signaling, a medium access control element, or a physical uplink control channel message.

Aspect 27: The method of any of Aspects 25-26, further comprising: transmitting a request, for the uplink transmission or the downlink transmission, for data aided PT-RSs on the multiple layers of the communication link.

Aspect 28: The method of Aspect 27, wherein the request comprises an indication of one or more of the multiple layers for data aided PT-RSs on the multiple layers of the communication link.

Aspect 29: The method of Aspect 25, further comprising: receiving the downlink transmission; and determining, based at least in part on the data aided PT-RSs on the multiple layers of the communication link, one or more of: a single common phase error (CPE) for multiple antennas associated with the multiple layers of the communication link, or CPEs for respective antennas of the multiple antennas.

Aspect 30: The method of Aspect 29, wherein determining the one or more of the single CPE for multiple antennas or the CPEs for respective antennas of the multiple antennas comprises: decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

Aspect 31: The method of Aspect 30, wherein decoding the data of the data aided PT-RSs on the multiple layers of the communication link comprises: decoding, based at least in part on one or more demodulation reference signal pilots, data of the data aided PT-RSs on the multiple layers of the communication link.

Aspect 32: The method of Aspect 29, wherein determining the one or more of the single CPE for multiple antennas or the CPEs for respective antennas of the multiple antennas comprises: generating, based at least in part on descrambling the data of the data aided PT-RSs on the multiple layers of the communication link, a soft data estimation per layer of the data aided PT-RSs on the multiple layers of the communication link; and determining, based at least in part on an average of the soft data estimation per layer, the one or more of the single CPE for multiple antennas or the CPEs for respective antennas of the multiple antennas.

Aspect 33: The method of any of Aspects 25-32, wherein data that is transmitted on resources associated with the data aided PT-RSs on the multiple layers of the communication link have a cyclical redundancy check (CRC) that is different from one or more CRCs associated with other data of the uplink transmission or the downlink transmission, and wherein the method further comprises decoding the data using one or more of convolution codes, polar codes, or low-density parity-check codes.

Aspect 34: The method of any of Aspects 25-33, wherein the data aided PT-RSs on the multiple layers of the communication link include a PT-RS sequence that is multiplexed with data.

Aspect 35: The method of any of Aspects 25-34, further comprising: transmitting a request for a modulation and coding scheme for symbols associated with the data aided PT-RSs on the multiple layers of the communication link.

Aspect 36: The method of Aspect 35, wherein transmitting the request for the modulation and coding scheme comprises: transmitting the request for the modulation and coding scheme with the request for data aided PT-RSs on the multiple layers of the communication link.

Aspect 37: The method of Aspect 35, wherein the request for the modulation and coding scheme indicates a requested difference between the modulation and coding scheme for symbols associated with the data aided PT-RSs on the multiple layers of the communication link and a modulation and coding scheme for symbols associated with other data of the uplink transmission or the downlink transmission.

Aspect 38: The method of any of Aspects 25-37, further comprising: receiving an indication of a modulation and coding scheme for symbols associated with the data aided PT-RSs on the multiple layers of the communication link.

Aspect 39: The method of any of Aspects 25-38, further comprising: decoding data that is multiplexed with a PT-RS sequence on resources associated with the data aided PT-RSs on the multiple layers of the communication link based at least in part on one or more of: a configured indication of the multiple layers for data aided PT-RSs on the multiple layers of the communication link, or a configured difference of a modulation and coding scheme for data aided PT-RSs on the multiple layers of the communication link and a modulation and coding scheme for other data of the uplink transmission or the downlink transmission.

Aspect 40: The method of any of Aspects 25-39, further comprising: transmitting an indication of a capability of the UE to communicate one or more of uplink transmissions or downlink transmissions with data aided PT-RSs on the multiple layers of the communication link.

Aspect 41: The method of Aspect 40, wherein transmitting the indication of the capability of the UE comprises: transmitting the indication via one or more of radio resource control signaling, a medium access control element, or a physical uplink control channel message.

Aspect 42: The method of any of Aspects 25-41, further comprising: receiving configuration information that indicates that a base station is to provide an indication of whether data aided PT-RSs on the multiple layers of the communication link is enabled.

Aspect 43: The method of any of Aspects 25-42, further comprising: receiving an indication to communicate based at least in part on data aided PT-RSs on the multiple layers of the communication link.

Aspect 44: The method of Aspect 43, wherein receiving the indication comprises: receiving the indication via one or more of: a downlink control information message, a medium access control element, or radio resource control signaling.

Aspect 45: The method of Aspect 43, wherein the indication to communicate based at least in part on data aided PT-RSs on the multiple layers of the communication link comprises: an indication of the multiple layers for data aided PT-RSs on the multiple layers of the communication link, or an indication of a modulation and coding scheme for data aided PT-RSs on the multiple layers of the communication link.

Aspect 46: The method of any of Aspects 25-45, further comprising: communicating the uplink transmission or the downlink transmission based at least in part on an assumption, based at least in part on transmitting the indication, that the uplink transmission or the downlink transmission is to be transmitted with data aided PT-RSs on the multiple layers of the communication link.

Aspect 47: The method of any of Aspects 25-46, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

Aspect 48: The method of Aspect 47, further comprising: reporting a NACK for the data aided PT-RSs on the multiple layers of the communication link; and receiving a repetition of the data aided PT-RSs on the multiple layers of the communication link via a subsequent PT-RS resource.

Aspect 49: A method of wireless communication performed by a base station, comprising: receiving a request, for an uplink transmission from a user equipment (UE) or a downlink transmission to the UE, for data aided phase tracking reference signals (PT-RSs) on multiple layers of a communication link; and communicating an uplink transmission or a downlink transmission based at least in part on the request.

Aspect 50: The method of Aspect 49, further comprising: determining whether to transmit the downlink transmission with data aided PT-RSs on the multiple layers of the communication link based at least in part on one or more of: a request from the UE to communicate with data aided PT-RSs on the multiple layers of the communication link, an amount of data buffered for the downlink transmission, a size of a resource grant associated with the downlink transmission, a reference signal received power associated with the UE, or movement of the UE.

Aspect 51: The method Aspect 49, further comprising: receiving the uplink transmission; and determining, based at least in part on the data aided PT-RSs on the multiple layers of the communication link, one or more of: a single common phase error (CPE) for multiple antennas associated with the multiple layers of the communication link, or CPEs for respective antennas of the multiple antennas.

Aspect 52: The method of Aspect 51, wherein determining the one or more of the single CPE for multiple antennas or the CPEs for respective antennas of the multiple antennas comprises: decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

Aspect 53: The method of Aspect 52, wherein decoding the data of the data aided PT-RSs on the multiple layers of the communication link comprises: decoding, based at least in part on one or more demodulation reference signal pilots, data of the data aided PT-RSs on the multiple layers of the communication link.

Aspect 54: The method of Aspect 51, wherein determining the one or more of the single CPE for multiple antennas or the CPEs for respective antennas of the multiple antennas comprises: generating, based at least in part on descrambling the data of the data aided PT-RSs on the multiple layers of the communication link, a soft data estimation per layer of the data aided PT-RSs on the multiple layers of the communication link; and determining, based at least in part on an average of the soft data estimation per layer, the one or more of the single CPE for multiple antennas or the CPEs for respective antennas of the multiple antennas.

Aspect 55: The method of any of Aspects 49-54, wherein data that is transmitted on resources associated with the data aided PT-RSs on the multiple layers of the communication link have a cyclical redundancy check (CRC) that is different from one or more CRCs associated with other data of the uplink transmission or the downlink transmission, and wherein the method further comprises decoding the data using one or more of convolution codes, polar codes, or low-density parity-check codes.

Aspect 56: The method of any of Aspects 49-55, wherein the data aided PT-RSs on the multiple layers of the communication link include a PT-RS sequence that is multiplexed with data.

Aspect 57: The method of any of Aspects 49-56, wherein the request comprises an indication of one or more of the multiple layers for data aided PT-RSs on the multiple layers of the communication link.

Aspect 58: The method of any of Aspects 49-57, further comprising: receiving a request for a modulation and coding scheme for symbols associated with the data aided PT-RSs on the multiple layers of the communication link.

Aspect 59: The method of Aspect 58, wherein receiving the request for the modulation and coding scheme comprises: receiving the request for the modulation and coding scheme with the request for data aided PT-RSs on the multiple layers of the communication link.

Aspect 60: The method of Aspect 58, wherein the request for the modulation and coding scheme indicates a requested difference between the modulation and coding scheme for symbols associated with the data aided PT-RSs on the multiple layers of the communication link and a modulation and coding scheme for symbols associated with other data of the uplink transmission or the downlink transmission.

Aspect 61: The method of any of Aspects 49-60, further comprising: transmitting an indication of a modulation and coding scheme for symbols associated with the data aided PT-RSs on the multiple layers of the communication link.

Aspect 62: The method of any of Aspects 49-61, further comprising: decoding data that is multiplexed with a PT-RS sequence on resources associated with the data aided PT-RSs on the multiple layers of the communication link based at least in part on one or more of: a configured indication of the multiple layers for data aided PT-RSs on the multiple layers of the communication link, or a configured difference of a modulation and coding scheme for data aided PT-RSs on the multiple layers of the communication link and a modulation and coding scheme for other data of the uplink transmission or the downlink transmission.

Aspect 63: The method of any of Aspects 49-62, further comprising: receiving an indication of a capability of the UE to communicate one or more of uplink transmissions or downlink transmissions with data aided PT-RSs on the multiple layers of the communication link.

Aspect 64: The method of any of Aspects 49-63, wherein receiving the indication of the capability of the UE comprises: receiving the indication via one or more of radio resource control signaling, a medium access control element, or a physical uplink control channel message.

Aspect 65: The method of any of Aspects 49-64, further comprising: transmitting configuration information that indicates that the base station is to provide an indication of whether data aided PT-RSs on the multiple layers of the communication link is enabled.

Aspect 66: The method of any of Aspects 49-65, further comprising: transmitting an indication to communicate based at least in part on data aided PT-RSs on the multiple layers of the communication link.

Aspect 67: The method of Aspect 66, wherein transmitting the indication comprises: transmitting the indication via one or more of: a downlink control information message, a medium access control element, or radio resource control signaling.

Aspect 68: The method of Aspect 66, wherein the indication to communicate based at least in part on data aided PT-RSs on the multiple layers of the communication link comprises: an indication of the multiple layers for data aided PT-RSs on the multiple layers of the communication link, or an indication of a modulation and coding scheme for data aided PT-RSs on the multiple layers of the communication link.

Aspect 69: The method of any of Aspects 49-68, further comprising: communicating the uplink transmission or the downlink transmission based at least in part on an assumption, based at least in part on receiving the request, that the uplink transmission or the downlink transmission is to be transmitted with data aided PT-RSs on the multiple layers of the communication link.

Aspect 70: The method of any of Aspects 49-69, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

Aspect 71: The method of any of Aspects 49-70, further comprising: receiving a NACK for the data aided PT-RSs on the multiple layers of the communication link; and transmitting a repetition of the data aided PT-RSs on the multiple layers of the communication link via a subsequent PT-RS resource.

Aspect 72: A method of wireless communication performed by a base station, comprising: receiving an indication of a capability of a user equipment (UE) to communicate one or more of uplink transmissions or downlink transmissions having data aided phase tracking reference signals (PT-RSs) on multiple layers of a communication link; and communicating an uplink transmission or a downlink transmission based at least in part on the indication.

Aspect 73: The method of Aspect 72, further comprising: determining whether to transmit the downlink transmission with data aided PT-RSs on the multiple layers of the communication link based at least in part on one or more of: a request from the UE to communicate with data aided PT-RSs on the multiple layers of the communication link, an amount of data buffered for the downlink transmission, a size of a resource grant associated with the downlink transmission, a reference signal received power associated with the UE, or movement of the UE.

Aspect 74: The method of Aspect 72, wherein receiving the indication of the capability of the UE comprises: receiving the indication via one or more of radio resource control signaling, a medium access control element, or a physical uplink control channel message.

Aspect 75: The method of Aspect 72, further comprising: receiving a request, for the uplink transmission or the downlink transmission, for data aided PT-RSs on the multiple layers of the communication link.

Aspect 76: The method of Aspect 75, wherein the request comprises an indication of one or more of the multiple layers for data aided PT-RSs on the multiple layers of the communication link.

Aspect 77: The method of any of Aspects 72-76, further comprising: receiving the uplink transmission; and determining, based at least in part on the data aided PT-RSs on the multiple layers of the communication link, one or more of: a single common phase error (CPE) for multiple antennas associated with the multiple layers of the communication link, or CPEs for respective antennas of the multiple antennas.

Aspect 78: The method of Aspect 77, wherein determining the one or more of the single CPE for multiple antennas or the CPEs for respective antennas of the multiple antennas comprises: decoding data of the data aided PT-RSs on the multiple layers of the communication link, re-encoding the data of the data aided PT-RSs on the multiple layers of the communication link, re-modulating the data of the data aided PT-RSs on the multiple layers of the communication link, performing channel estimation based at least in part on the re-modulated data of the data aided PT-RSs on the multiple layers of the communication link, and determining, based at least in part on the channel estimation, the one or more of the single CPE for multiple antennas or the CPEs for respective antennas of the multiple antennas.

Aspect 79: The method of Aspect 78, wherein decoding the data of the data aided PT-RSs on the multiple layers of the communication link comprises: decoding, based at least in part on one or more demodulation reference signal pilots, data of the data aided PT-RSs on the multiple layers of the communication link.

Aspect 80: The method of Aspect 77, wherein determining the one or more of the single CPE for multiple antennas or the CPEs for respective antennas of the multiple antennas comprises: generating, based at least in part on descrambling the data of the data aided PT-RSs on the multiple layers of the communication link, a soft data estimation per layer of the data aided PT-RSs on the multiple layers of the communication link; and determining, based at least in part on an average of the soft data estimation per layer, the one or more of the single CPE for multiple antennas or the CPEs for respective antennas of the multiple antennas.

Aspect 81: The method of any of Aspects 72-80, wherein data that is transmitted on resources associated with the data aided PT-RSs on the multiple layers of the communication link have a cyclical redundancy check (CRC) that is different from one or more CRCs associated with other data of the uplink transmission or the downlink transmission, and wherein the method further comprises decoding the data using one or more of convolution codes, polar codes, or low-density parity-check codes.

Aspect 82: The method of any of Aspects 72-81, wherein the data aided PT-RSs on the multiple layers of the communication link include a PT-RS sequence that is multiplexed with data.

Aspect 83: The method of any of Aspects 72-82, further comprising: receiving a request for a modulation and coding scheme for symbols associated with the data aided PT-RSs on the multiple layers of the communication link.

Aspect 84: The method of Aspect 83, wherein receiving the request for the modulation and coding scheme comprises: receiving the request for the modulation and coding scheme with the request for data aided PT-RSs on the multiple layers of the communication link.

Aspect 85: The method of Aspect 83, wherein the request for the modulation and coding scheme indicates a requested difference between the modulation and coding scheme for symbols associated with the data aided PT-RSs on the multiple layers of the communication link and a modulation and coding scheme for symbols associated with other data of the uplink transmission or the downlink transmission.

Aspect 86: The method of any of Aspects 72-85, further comprising: transmitting an indication of a modulation and coding scheme for symbols associated with the data aided PT-RSs on the multiple layers of the communication link.

Aspect 87: The method of any of Aspects 72-86, further comprising: decoding data that is multiplexed with a PT-RS sequence on resources associated with the data aided PT-RSs on the multiple layers of the communication link based at least in part on one or more of: a configured indication of the multiple layers for data aided PT-RSs on the multiple layers of the communication link, or a configured difference of a modulation and coding scheme for data aided PT-RSs on the multiple layers of the communication link and a modulation and coding scheme for other data of the uplink transmission or the downlink transmission.

Aspect 88: The method of any of Aspects 72-87, further comprising: receiving an indication of a capability of the UE to communicate one or more of uplink transmissions or downlink transmissions with data aided PT-RSs on the multiple layers of the communication link.

Aspect 89: The method of Aspect 88, wherein receiving the indication of the capability of the UE comprises: receiving the indication via one or more of radio resource control signaling, a medium access control element, or a physical uplink control channel message.

Aspect 90: The method of any of Aspects 72-89, further comprising: transmitting configuration information that indicates that the base station is to provide an indication of whether data aided PT-RSs on the multiple layers of the communication link is enabled.

Aspect 91: The method of any of Aspects 72-90, further comprising: transmitting an indication to communicate based at least in part on data aided PT-RSs on the multiple layers of the communication link.

Aspect 92: The method of Aspect 91, wherein transmitting the indication comprises: transmitting the indication via one or more of: a downlink control information message, a medium access control element, or radio resource control signaling.

Aspect 93: The method of Aspect 91, wherein the indication to communicate based at least in part on data aided PT-RSs on the multiple layers of the communication link comprises: an indication of the multiple layers for data aided PT-RSs on the multiple layers of the communication link, or an indication of a modulation and coding scheme for data aided PT-RSs on the multiple layers of the communication link.

Aspect 94: The method of any of Aspects 72-93, further comprising: communicating the uplink transmission or the downlink transmission based at least in part on an assumption, based at least in part on receiving the indication, that the uplink transmission or the downlink transmission is to be transmitted with data aided PT-RSs on the multiple layers of the communication link.

Aspect 95: The method of any of Aspects 72-94, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

Aspect 96: The method of Aspect 95, further comprising: receiving a NACK for the data aided PT-RSs on the multiple layers of the communication link; and receiving a repetition of the data aided PT-RSs on the multiple layers of the communication link via a subsequent PT-RS resource.

Aspect 97: An apparatus for wireless communication at a device, comprising a processor; memory coupled with the processor; and instructions stored in the memory and executable by the processor to cause the apparatus to perform the method of one or more Aspects of Aspects 1-96.

Aspect 98: A device for wireless communication, comprising a memory and one or more processors coupled to the memory, the memory and the one or more processors configured to perform the method of one or more Aspects of Aspects 1-96.

Aspect 99: An apparatus for wireless communication, comprising at least one means for performing the method of one or more Aspects of Aspects 1-96.

Aspect 100: A non-transitory computer-readable medium storing code for wireless communication, the code comprising instructions executable by a processor to perform the method of one or more Aspects of Aspects 1-96.

Aspect 101: A non-transitory computer-readable medium storing a set of instructions for wireless communication, the set of instructions comprising one or more instructions that, when executed by one or more processors of a device, cause the device to perform the method of one or more Aspects of Aspects 1-96.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting an indication of a capability of the UE to communicate using data aided phase tracking reference signals (PT-RSs) on multiple layers of a communication link, the indication being associated with the UE requesting to communicate using the data aided PT-RSs on the multiple layers of the communication link, wherein the data aided PT-RSs include a PT-RS sequence multiplexed with data; and
   communicating an uplink transmission or a downlink transmission based at least in part on the request.

2. The method of claim 1, further comprising:
   receiving the downlink transmission; and
   determining, based at least in part on the data aided PT-RSs on the multiple layers of the communication link, one or more of:
      a single phase error (CPE) for multiple antennas associated with the multiple layers of the communication link, or
      CPEs for respective antennas of the multiple antennas.

3. The method of claim 2, wherein determining the one or more of the single CPE for multiple antennas or the CPEs for respective antennas of the multiple antennas comprises:
   decoding the data of the data aided PT-RSs on the multiple layers of the communication link,
   re-encoding the data of the data aided PT-RSs on the multiple layers of the communication link,
   re-modulating the data of the data aided PT-RSs on the multiple layers of the communication link,
   performing channel estimation based at least in part on the re-modulated data of the data aided PT-RSs on the multiple layers of the communication link, and
   determining, based at least in part on the channel estimation, the one or more of the single CPE for multiple antennas or the CPEs for respective antennas of the multiple antennas.

4. The method of claim 2, wherein determining the one or more of the single CPE for multiple antennas or the CPEs for respective antennas of the multiple antennas comprises:
   generating, based at least in part on descrambling the data of the data aided PT-RSs on the multiple layers of the communication link, a soft data estimation per layer of the data aided PT-RSs on the multiple layers of the communication link; and
   determining, based at least in part on an average of the soft data estimation per layer, the one or more of the single CPE for multiple antennas or the CPEs for respective antennas of the multiple antennas.

5. The method of claim 1, further comprising:
   receiving an indication of a modulation and coding scheme for symbols associated with the data aided PT-RSs on the multiple layers of the communication link.

6. The method of claim 5, wherein the indication of the modulation and coding scheme indicates a difference between the modulation and coding scheme for symbols associated with the data aided PT-RSs and a modulation and coding scheme for symbols associated with other data of the uplink transmission or the downlink transmission.

7. The method of claim 1, further comprising:
   transmitting the request to communicate using the data aided PT-RSs on the multiple layers of the communication link, the request to communicate being transmitted based at least in part on the transmitting of the indication of the capability of the UE.

8. The method of claim 1, wherein the request includes the indication of the capability of the UE to communicate using the data aided PT-RSs on the multiple layers of the communication link.

9. The method of claim 1, further comprising:
   receiving configuration information that indicates that a network entity is to provide an indication of whether data aided PT-RSs on the multiple layers of the communication link is enabled.

10. The method of claim 1, further comprising:
    receiving an indication to communicate based at least in part on data aided PT-RSs on the multiple layers of the communication link.

11. The method of claim 10, wherein the indication to communicate based at least in part on data aided PT-RSs on the multiple layers of the communication link comprises:
    an indication of the multiple layers for data aided PT-RSs on the multiple layers of the communication link, or
    an indication of a modulation and coding scheme for data aided PT-RSs on the multiple layers of the communication link.

12. The method of claim 1, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

13. The method of claim 1, wherein the data corresponding to the data aided PT-RSs is associated with a cyclical redundancy check (CRC) for each respective layer of the multiple layers that is different from one or more CRCs associated with other data of the uplink transmission or the downlink transmission.

14. A user equipment (UE) for wireless communication, comprising:
one or more memories; and
one or more processors coupled to the one or more memories, the one or more processors configured to:
transmit an indication of a capability of the UE to communicate using data aided phase tracking reference signals (PT-RSs) on multiple layers of a communication link, the indication being associated with the UE requesting to communicate using the data aided PT-RSs on the multiple layers of the communication link, wherein the data aided PT-RSs include a PT-RS sequence multiplexed with data; and
communicate an uplink transmission or a downlink transmission based at least in part on the request.

15. The UE of claim 14, wherein the one or more processors are further configured to:
receive the downlink transmission; and
determine, based at least in part on the data aided PT-RSs on the multiple layers of the communication link, one or more of:
a single common phase error (CPE) for multiple antennas associated with the multiple layers of the communication link, or
CPEs for respective antennas of the multiple antennas.

16. The UE of claim 15, wherein the one or more processors, when determining the one or more of the single CPE for multiple antennas or the CPEs for respective antennas of the multiple antennas, are configured to:
decode the data of the data aided PT-RSs on the multiple layers of the communication link,
re-encode the data of the data aided PT-RSs on the multiple layers of the communication link,
re-modulate the data of the data aided PT-RSs on the multiple layers of the communication link,
perform channel estimation based at least in part on the re-modulated data of the data aided PT-RSs on the multiple layers of the communication link, and
determine, based at least in part on the channel estimation, the one or more of the single CPE for multiple antennas or the CPEs for respective antennas of the multiple antennas.

17. The UE of claim 15, wherein the one or more processors, when determining the one or more of the single CPE for multiple antennas or the CPEs for respective antennas of the multiple antennas, are configured to:
generate, based at least in part on descrambling the data of the data aided PT-RSs on the multiple layers of the communication link, a soft data estimation per layer of the data aided PT-RSs on the multiple layers of the communication link; and
determine, based at least in part on an average of the soft data estimation per layer, the one or more of the single CPE for multiple antennas or the CPEs for respective antennas of the multiple antennas.

18. The UE of claim 14, wherein the one or more processors are further configured to:
receive an indication of a modulation and coding scheme for symbols associated with the data aided PT-RSs on the multiple layers of the communication link.

19. The UE of claim 18, wherein the indication of the modulation and coding scheme indicates a difference between the modulation and coding scheme for symbols associated with the data aided PT-RSs and a modulation and coding scheme for symbols associated with other data of the uplink transmission or the downlink transmission.

20. The UE of claim 14, wherein the one or more processors are further configured to:
transmit the request to communicate using the data aided PT-RSs on the multiple layers of the communication link, the request to communicate being transmitted based at least in part on the transmitting of the indication of the capability of the UE.

21. The UE of claim 14, wherein the request includes the indication of the capability of the UE to communicate using the data aided PT-RSs on the multiple layers of the communication link.

22. The UE of claim 14, wherein the one or more processors are further configured to:
receive configuration information that indicates that a network entity is to provide an indication of whether data aided PT-RSs on the multiple layers of the communication link is enabled.

23. The UE of claim 14, wherein the one or more processors are further configured to:
receive an indication to communicate based at least in part on data aided PT-RSs on the multiple layers of the communication link.

24. The UE of claim 23, wherein the indication to communicate based at least in part on data aided PT-RSs on the multiple layers of the communication link comprises:
an indication of the multiple layers for data aided PT-RSs on the multiple layers of the communication link, or
an indication of a modulation and coding scheme for data aided PT-RSs on the multiple layers of the communication link.

25. The UE of claim 14, wherein data transmitted on resources associated with the data aided PT-RSs on the multiple layers of the communication link is associated with a dedicated acknowledgement/negative acknowledgment (ACK/NACK) bit that is different from one or more ACK/NACK bits that are associated with other data communicated via the uplink transmission or the downlink transmission.

26. The UE of claim 14, wherein the data corresponding to the data aided PT-RSs is associated with a cyclical redundancy check (CRC) for each respective layer of the multiple layers that is different from one or more CRCs associated with other data of the uplink transmission or the downlink transmission.

27. A non-transitory computer-readable medium storing a set of instructions for wireless communication, the set of instructions comprising:
one or more instructions that, when executed by one or more processors of a user equipment (UE), cause the UE to:
transmit an indication of a capability of the UE to communicate using data aided phase tracking reference signals (PT-RSs) on multiple layers of a communication link, the indication being associated with the UE requesting to communicate using the data aided PT-RSs on the multiple layers of the communication link, wherein the data aided PT-RSs include a PT-RS sequence multiplexed with data; and communicate an uplink transmission or a downlink transmission based at least in part on the request.

28. The non-transitory computer-readable medium of claim 27, wherein the data corresponding to the data aided PT-RSs is associated with a cyclical redundancy check (CRC) for each respective layer of the multiple layers that is different from one or more CRCs associated with other data of the uplink transmission or the downlink transmission.

29. An apparatus for wireless communication, comprising:
- means for transmitting an indication of a capability of the apparatus to communicate using data aided phase tracking reference signals (PT-RSs) on multiple layers of a communication link, the indication being associated with the apparatus requesting to communicate using the data aided PT-RSs on the multiple layers of the communication link, wherein the data aided PT-RSs include a PT-RS sequence multiplexed with data; and
- means for communicating an uplink transmission or a downlink transmission based at least in part on the request.

30. The apparatus of claim 29, wherein the data corresponding to the data aided PT-RSs is associated with a cyclical redundancy check (CRC) for each respective layer of the multiple layers that is different from one or more CRCs associated with other data of the uplink transmission or the downlink transmission.

* * * * *